US012739585B2

(12) United States Patent
Onishi et al.

(10) Patent No.: US 12,739,585 B2
(45) Date of Patent: Sep. 15, 2026

(54) INFORMATION PROCESSING DEVICE, INFORMATION PROCESSING TERMINAL, INFORMATION PROCESSING METHOD, AND PROGRAM

(71) Applicants: Sony Group Corporation, Tokyo (JP); Sony Interactive Entertainment Inc., Tokyo (JP)

(72) Inventors: Takuto Onishi, Tokyo (JP); Keiichi Kitahara, Tokyo (JP); Isamu Terasaka, Tokyo (JP); Masashi Fujihara, Tokyo (JP); Toru Nakagawa, Tokyo (JP)

(73) Assignees: Sony Group Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 252 days.

(21) Appl. No.: 18/024,742

(22) PCT Filed: Sep. 10, 2021

(86) PCT No.: PCT/JP2021/033279

§ 371 (c)(1),
(2) Date: Mar. 3, 2023

(87) PCT Pub. No.: WO2022/054899

PCT Pub. Date: Mar. 17, 2022

(65) Prior Publication Data

US 2023/0370801 A1 Nov. 16, 2023

(30) Foreign Application Priority Data

Sep. 10, 2020 (JP) ................................ 2020-152418

(51) Int. Cl.
*H04S 7/00* (2006.01)

(52) U.S. Cl.
CPC .......... *H04S 7/302* (2013.01); *H04S 2420/01* (2013.01)

(58) Field of Classification Search
CPC ................ H04S 7/302; H04S 2420/01; H04S 2400/11; H04M 3/568
See application file for complete search history.

(56) References Cited

U.S. PATENT DOCUMENTS

2010/0215164 A1 8/2010 Sandgren et al.
2017/0353811 A1* 12/2017 McGibney ............ H04H 60/04
(Continued)

FOREIGN PATENT DOCUMENTS

CN 111543068 A 8/2020
JP H11-331992 A 11/1999
(Continued)

OTHER PUBLICATIONS

International Search Report and English translation thereof mailed Nov. 22, 2021 in connection with International Application No. PCT/JP2021/033279.

*Primary Examiner* — Jason R Kurr
(74) *Attorney, Agent, or Firm* — Wolf, Greenfield & Sacks, P.C.

(57) ABSTRACT

An information processing device according to an aspect of the present technology includes a storage unit that stores HRTF data corresponding to a plurality of positions based on a listening position, and a sound image localization processing unit that performs a sound image localization process based on the HRTF data corresponding to a position, in a virtual space, of a participant participating in a conversation via a network and sound data of the participant. The present technology can be applied to a computer that performs remote conference.

13 Claims, 28 Drawing Sheets

(56) References Cited

U.S. PATENT DOCUMENTS

| | | | | |
|---|---|---|---|---|
| 2019/0174245 | A1* | 6/2019 | Lyren | H02M 1/08 |
| 2020/0014792 | A1 | 1/2020 | Lyren et al. | |

FOREIGN PATENT DOCUMENTS

| | | | |
|---|---|---|---|
| JP | 2001-274912 | A | 10/2001 |
| JP | 2018-148323 | A | 9/2018 |

* cited by examiner

FIG.12

PARTICIPANT INFORMATION

- USER INFORMATION
- POSITIONAL INFORMATION
- SETTING INFORMATION (BACKGROUND SOUND, ETC.)
- VOLUME INFORMATION

INFORMATION PROCESSING DEVICE, INFORMATION PROCESSING TERMINAL, INFORMATION PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2021/033279, filed in the Japanese Patent Office as a Receiving Office on Sep. 10, 2021, which claims priority to Japanese Patent Application Number JP2020-152418, filed in the Japanese Patent Office on Sep. 10, 2020, each of which is hereby incorporated by reference in its entirety.

FIELD

The present technology particularly relates to an information processing device, an information processing terminal, an information processing method, and a program capable of performing conversation with realistic feeling.

BACKGROUND

A so-called remote conference in which a plurality of remote participants hold a conference using a device such as a PC is performed. By starting a web browser or a dedicated application installed in the PC and accessing an access destination designated by the URL allocated for each conference, a user who knows the URL can participate in the conference as a participant.

The participant's voice collected by the microphone is transmitted to a device used by another participant via the server to output from a headphone or a speaker. Furthermore, a video showing the participant imaged by the camera is transmitted to a device used by another participant via the server and displayed on a display of the device.

As a result, each participant can have a conversation while looking at the faces of another participant.

CITATION LIST

Patent Literature

Patent Literature 1: JP 11-331992 A

SUMMARY

Technical Problem

It is difficult to hear the voices when a plurality of participants speak at the same time.

In addition, since the voice of the participant is only output in a planar manner, it is not possible to feel a sound image or the like, and it is difficult to obtain the sense that the participant exists from the voice.

The present technology has been made in view of such a situation, and an object thereof is to enable conversation with realistic feeling.

Solution to Problem

An information processing device according to one aspect of the present technology includes: a storage unit that stores HRTF data corresponding to a plurality of positions based on a listening position; and a sound image localization processing unit that performs a sound image localization process based on the HRTF data corresponding to a position, in a virtual space, of a participant participating in a conversation via a network and sound data of the participant.

An information processing terminal according to one aspect of the present technology includes: a sound reception unit that receives sound data of a participant who is an utterer obtained by performing a sound image localization process, the sound data being transmitted from an information processing device that stores HRTF data corresponding to a plurality of positions based on a listening position and performs the sound image localization process based on the HRTF data corresponding to a position, in a virtual space, of the participant participating in a conversation via a network and sound data of the participant, and outputs a voice of the utterer.

In one aspect of this technology, HRTF data corresponding to a plurality of positions based on a listening position are stored; and a sound image localization process is performed based on the HRTF data corresponding to a position, in a virtual space, of a participant participating in a conversation via a network and sound data of the participant.

In one aspect of this technology, sound data of a participant who is an utterer obtained by performing a sound image localization process are received, the sound data being transmitted from an information processing device that stores HRTF data corresponding to a plurality of positions based on a listening position and performs the sound image localization process based on the HRTF data corresponding to a position, in a virtual space, of the participant participating in a conversation via a network and sound data of the participant are received, and a voice of the utterer is output.

BRIEF DESCRIPTION OF DRAWINGS

FIG. 12 is a diagram illustrating an example of participant information.

DESCRIPTION OF EMBODIMENTS

Hereinafter, modes for carrying out the present technology will be described. The description will be given in the following order.

1. Configuration of Tele-communication System
2. Basic Operation
3. Configuration of each device
4. Use case of sound image localization
5. Modification <<Configuration of Tele-communication System>>

Figure 1:
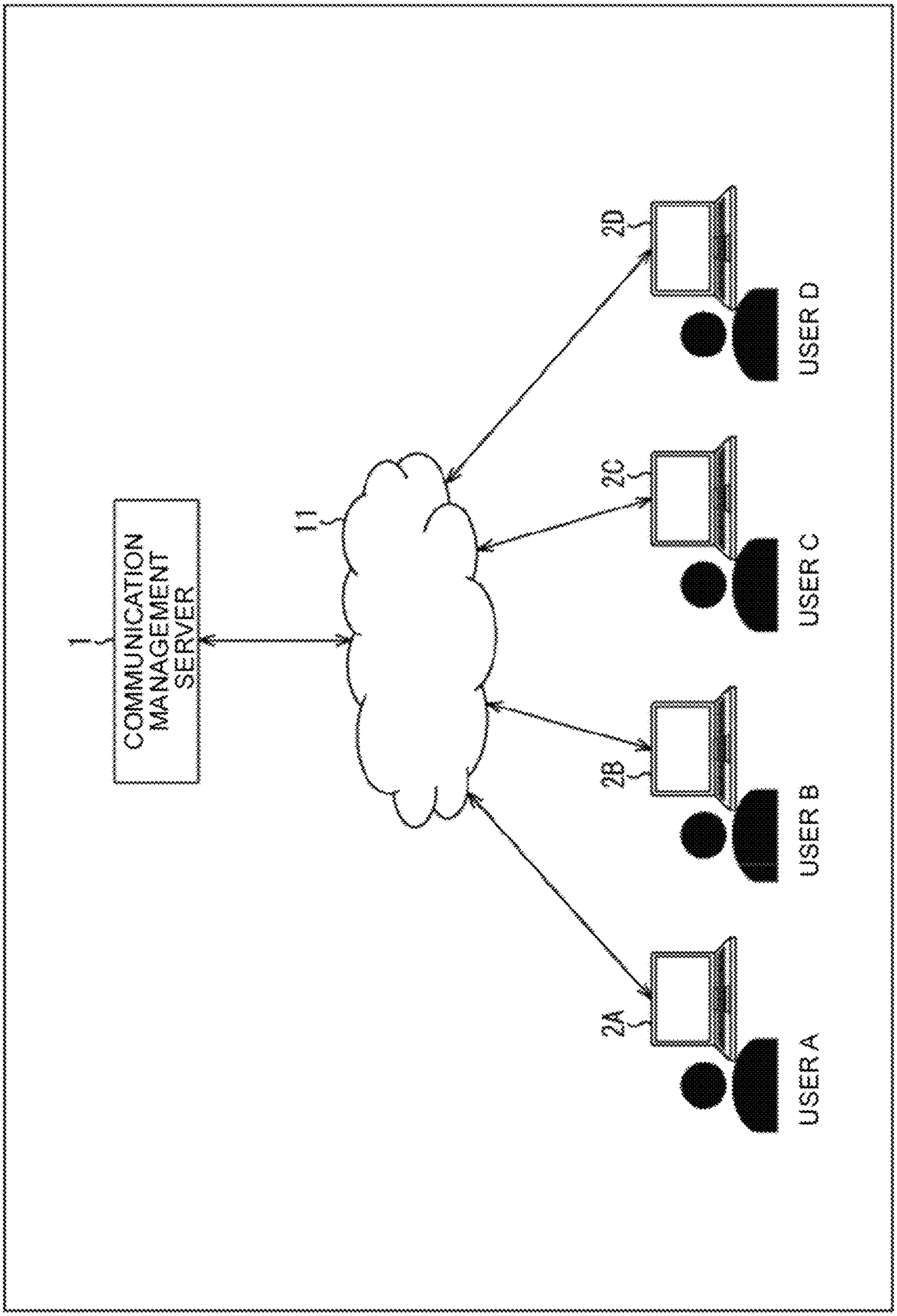
FIG. 1 is a diagram illustrating a configuration example of a Tele-communication system according to an embodiment of the present technology.

FIG. 1 is a diagram illustrating a configuration example of a Tele-communication system according to an embodiment of the present technology.

The Tele-communication system in FIG. 1 is configured by connecting a plurality of client terminals used by conference participants to the communication management server 1 via a network 11 such as the Internet. In the example of FIG. 1, client terminals 2A to 2D which are PCs are illustrated as client terminals used by users A to D who are participants of the conference.

Another device such as a smartphone or a tablet terminal including a sound input device such as a microphone and a sound output device such as a headphone or a speaker may be used as the client terminal. In a case where it is not necessary to distinguish between the client terminals 2A to 2D, the client terminal is appropriately referred to as a client terminal 2.

The users A to D are users who participate in the same conference. Note that the number of users participating in the conference is not limited to four.

The communication management server 1 manages a conference held by a plurality of users who have a conversation online. The communication management server 1 is an information processing device that controls transmission and reception of voices between the client terminals 2 and manages a so-called remote conference.

Figure 2:
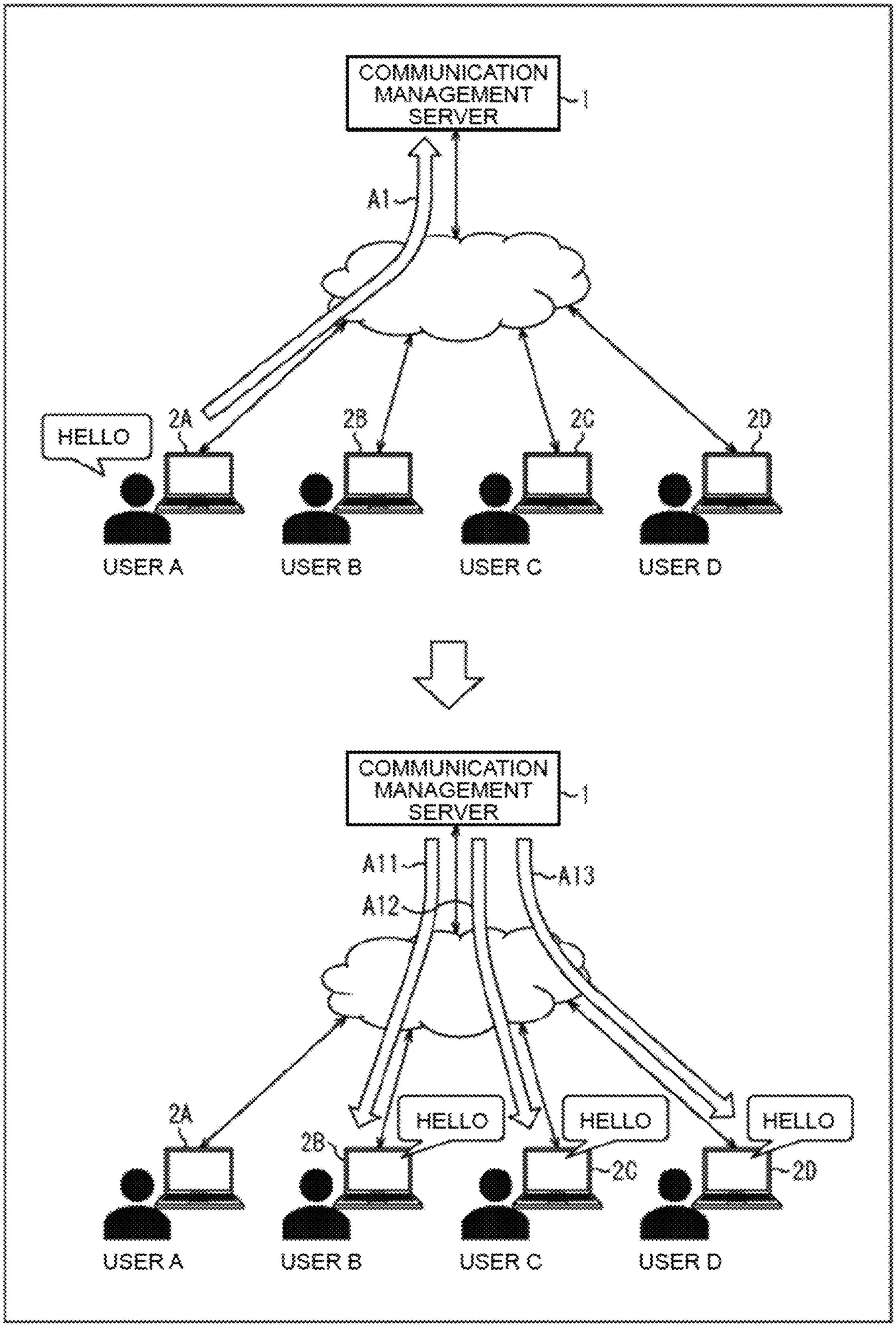
FIG. 2 is a diagram illustrating an example of transmission and reception of sound data.

For example, as indicated by an arrow A1 in the upper part of FIG. 2, the communication management server 1 receives the sound data of the user A transmitted from the client terminal 2A in response to the utterance of the user A. The sound data of the user A collected by the microphone provided in the client terminal 2A is transmitted from the client terminal 2A.

The communication management server 1 transmits the sound data of the user A to each of the client terminals 2B to 2D as indicated by arrows A11 to A13 in the lower part of FIG. 2 to output the voice of the user A. In a case where the user A utters as an utterer, the users B to D become listeners. Hereinafter, a user who is an utterer is referred to as an uttering user, and a user who is a listener is referred to as a listening user as appropriate.

Similarly, in a case where another user has made an utterance, the sound data transmitted from the client terminal 2 used by the uttering user is transmitted to the client terminal 2 used by the listening user via the communication management server 1.

The communication management server 1 manages the position of each user in the virtual space. The virtual space is, for example, a three-dimensional space virtually set as a place where a conference is held. The position in the virtual space is represented by three-dimensional coordinates.

Figure 3:
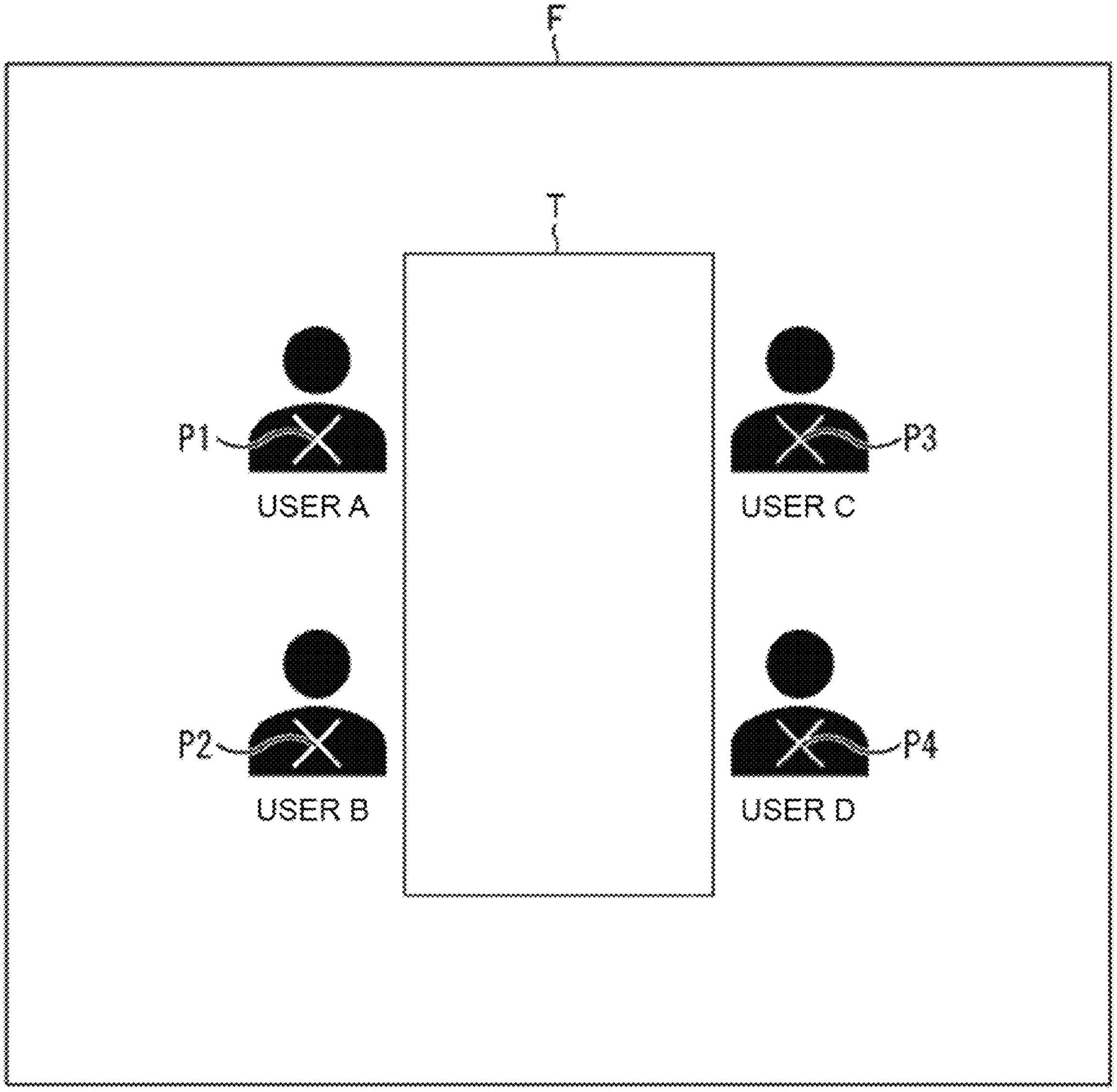
FIG. 3 is a plan view illustrating an example of a position of a user in a virtual space.

FIG. 3 is a plan view illustrating an example of the position of the user in the virtual space.

In the example of FIG. 3, a vertically long rectangular table T is disposed substantially at the center of a virtual space indicated by a rectangular frame F, and positions P1 to P4, which are positions around the table T, are set as positions of users A to D. The front direction of each user is the direction toward the table T from the position of each user.

Figure 4:
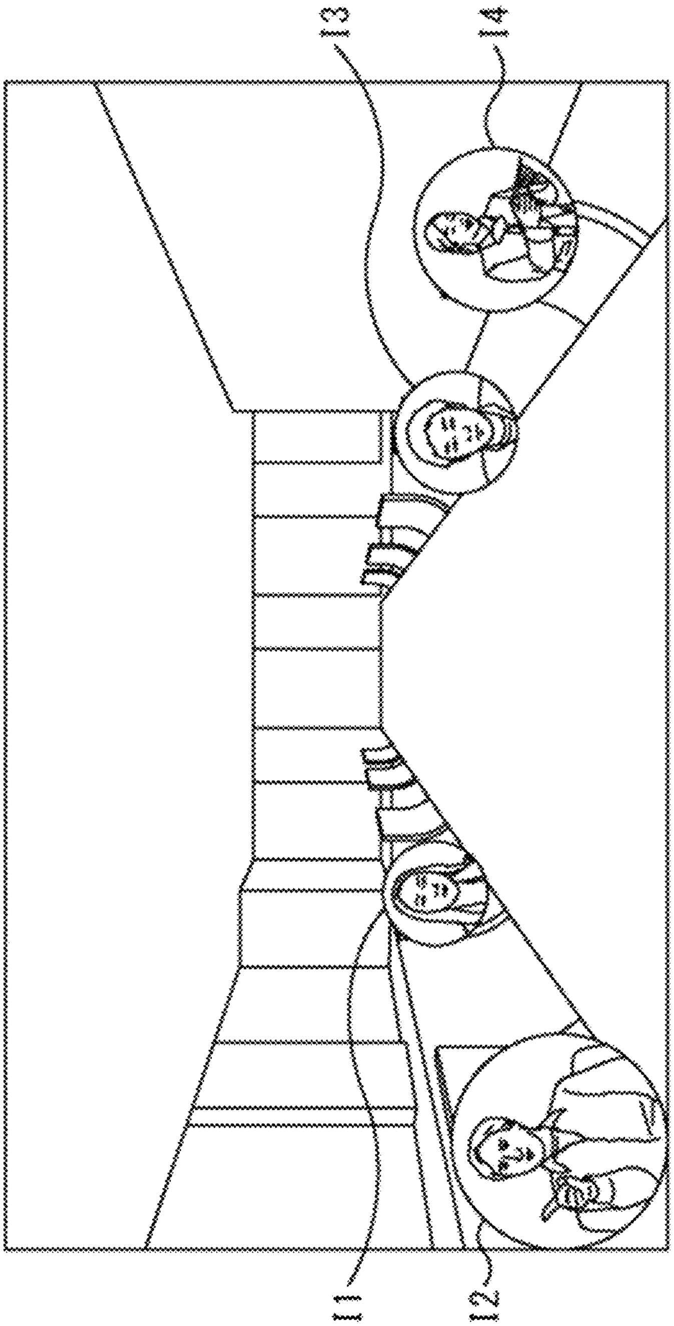
FIG. 4 is a diagram illustrating a display example of a remote conference screen.

During the conference, on the screen of the client terminal 2 used by each user, as illustrated in FIG. 4, a participant icon that is information visually representing the user is displayed in superposition with a background image representing a place where the conference is held. The position of the participant icon on the screen is a position corresponding to the position of each user in the virtual space.

In the example of FIG. 4, the participant icon is configured as a circular image including the user's face. The participant icon is displayed in a size corresponding to the distance from the reference position set in the virtual space to the position of each user. The participant icons I1 to I4 represent users A to D, respectively.

For example, the position of each user is automatically set by the communication management server 1 when the user participates in the conference. The position in the virtual space may be set by the user himself/herself by moving the participant icon on the screen of FIG. 4 or the like.

The communication management server 1 has HRTF data that is data of a head-related transfer function (HRTF) representing sound transfer characteristics from a plurality of positions to a listening position when each position in the virtual space is set as the listening position. The HRTF data corresponding to a plurality of positions based on each listening position in the virtual space is prepared in the communication management server 1.

The communication management server 1 performs a sound image localization process using the HRTF data on the sound data so that the voice of the uttering user can be heard from the position of the uttering user in the virtual space for each listening user to transmit the sound data obtained by performing the sound image localization process.

The sound data transmitted to the client terminal 2 as described above is sound data obtained by performing the sound image localization process in the communication management server 1. The sound image localization process includes rendering such as vector based amplitude panning (VBAP) based on positional information, and binaural processing using HRTF data.

That is, the voice of each uttering user is processed in the communication management server 1 as the sound data of the object audio. For example, L/R two-channel channel-based audio data generated by the sound image localization process in the communication management server 1 is transmitted from the communication management server 1 to each client terminal 2, and the voice of the uttering user is output from headphones or the like provided in the client terminal 2.

By performing the sound image localization process using the HRTF data according to the relative positional relationship between the position of the listening user and the position of the uttering user, each of the listening users feels that the voice of the uttering user is heard from the position of the uttering user.

Figure 5:
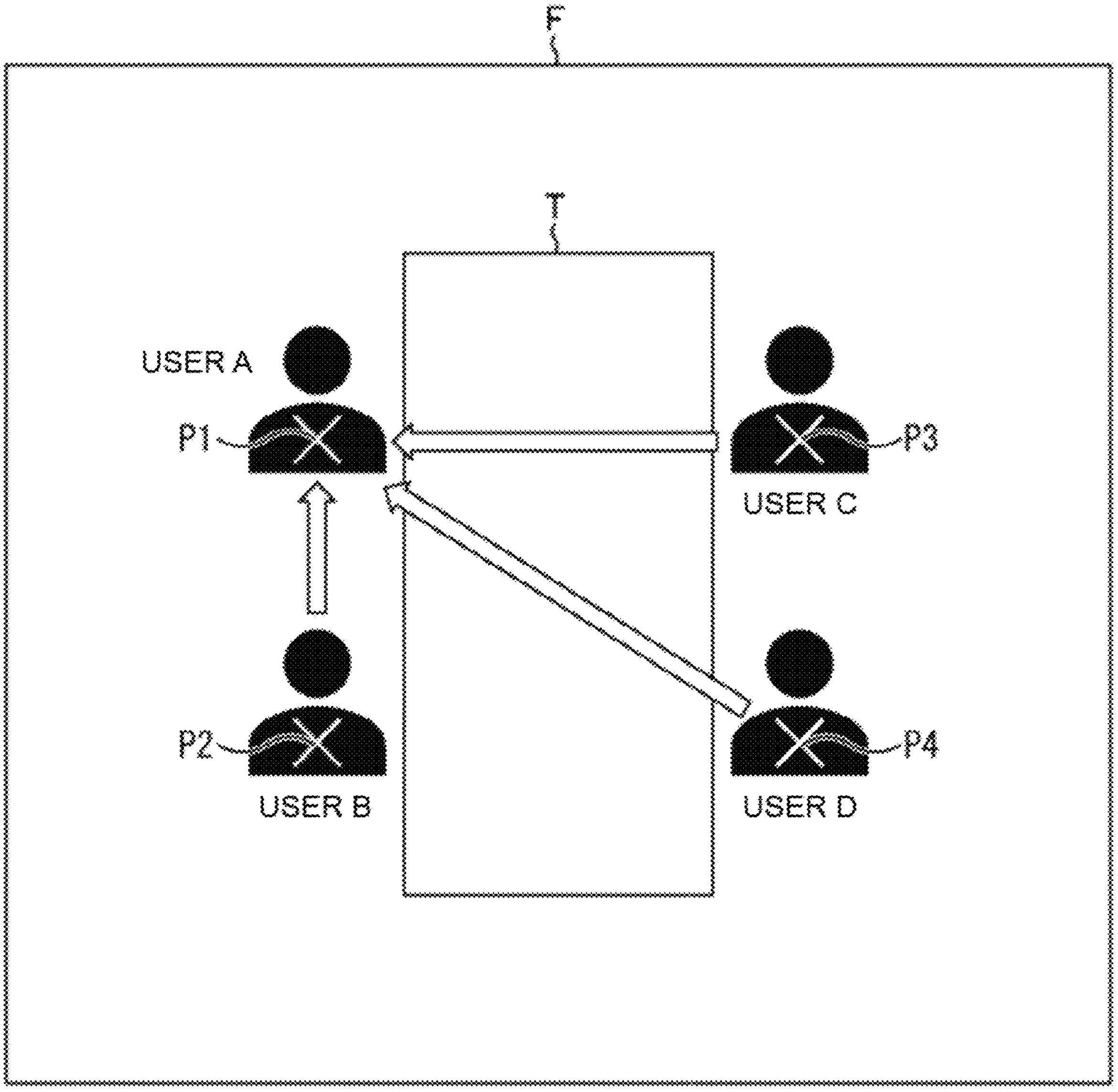
FIG. 5 is a diagram illustrating an example of how a voice is heard.

FIG. 5 is a diagram illustrating an example of how a voice is heard.

When the user A whose position P1 is set as the position in the virtual space is focused on as the listening user, the voice of the user B is heard from the near right by performing the sound image localization process based on the HRTF data between the position P2 and the position P1 with the position P2 as the sound source position as indicated by the arrow in FIG. 5. The front of the user A having a conversation with the face facing the client terminal 2A is the direction toward the client terminal 2A.

Furthermore, the voice of the user C is heard from the front by performing the sound image localization process based on the HRTF data between the position P3 and the position P1 with the position P3 as the sound source position. The voice of the user D is heard from the far right by performing the sound image localization process based on the HRTF data between the position P4 and the position P1 with the position P4 as the sound source position.

Figure 6:
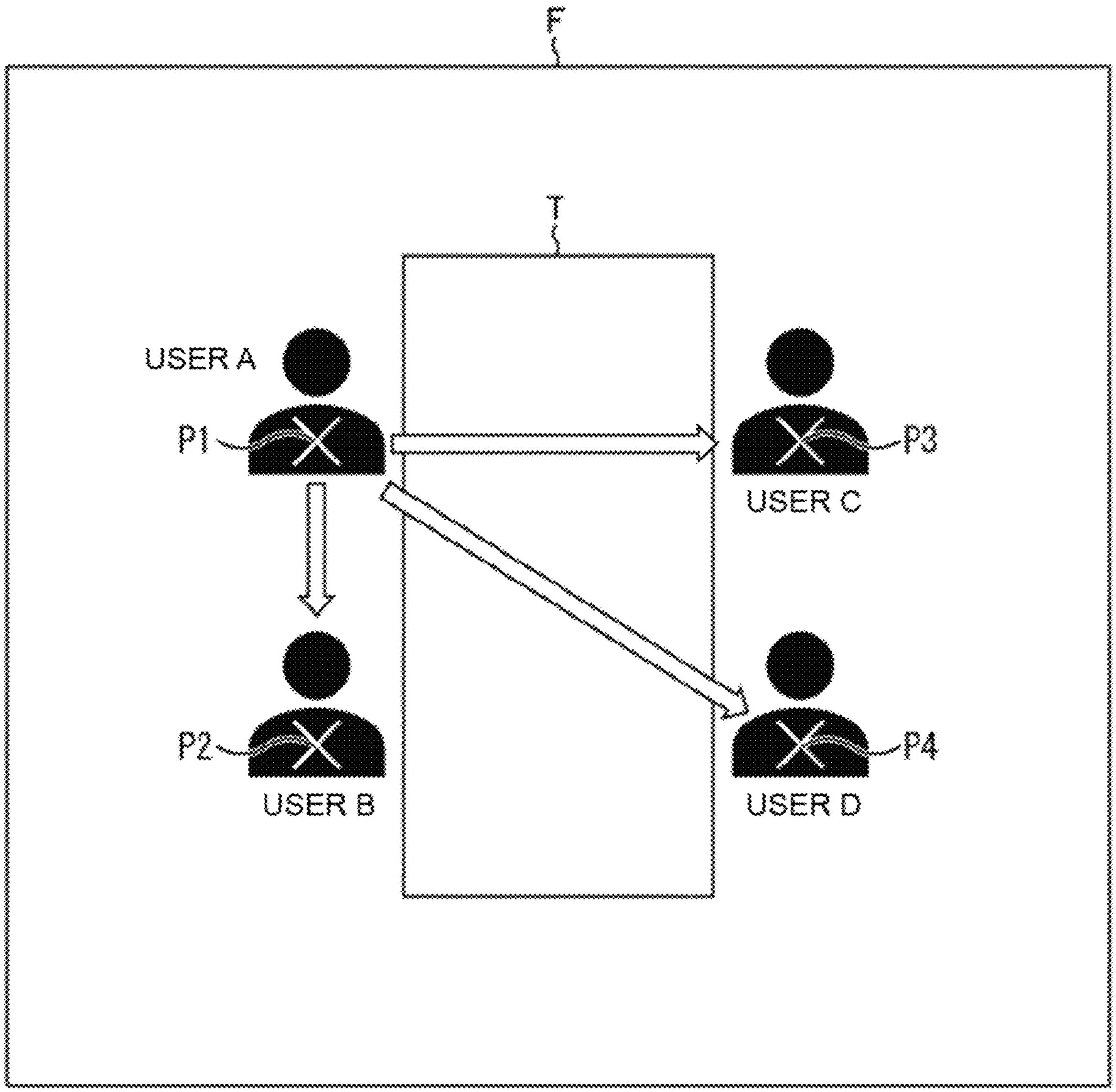
FIG. 6 is a diagram illustrating another example of how a voice is heard.

The same applies to a case where another user is a listening user. For example, as illustrated in FIG. 6, the voice of the user A is heard from the near left for the user B who is having a conversation with the face facing the client terminal 2B, and is heard from the front for the user C who is having a conversation with the face facing the client terminal 2C. Furthermore, the voice of the user A is heard from the far right for the user D who is having a conversation with the face facing the client terminal 2D.

As described above, in the communication management server 1, the sound data for each listening user is generated according to the positional relationship between the position of each listening user and the position of the uttering user, and is used for outputting the voice of the uttering user. The sound data transmitted to each of the listening users is sound data that is different in how the uttering user is heard according to the positional relationship between the position of each of the listening users and the position of the uttering user.

Figure 7:
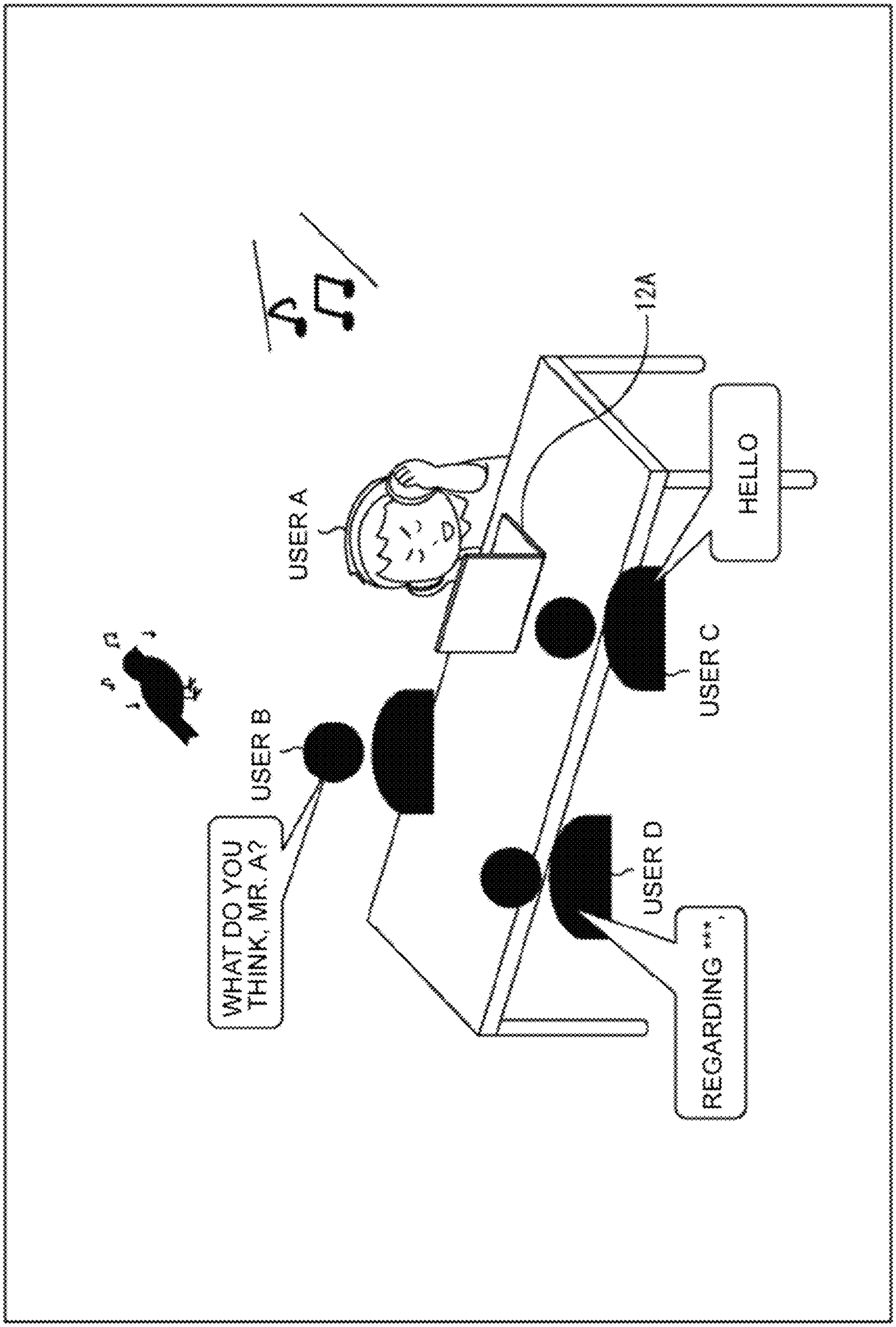
FIG. 7 is a diagram illustrating a state of a user participating in a conference.

FIG. 7 is a diagram illustrating a state of a user participating in a conference.

For example, the user A wearing the headphone and participating in the conference listens to the voices of the users B to D whose sound images are localized at the near right position, the front position, and the far right position, respectively, and has a conversation. As described with reference to FIG. 5 and the like, based on the position of the user A, the positions of the users B to D are the near right position, the front position, and the far right position, respectively. Note that, in FIG. 7, the fact that the users B to D are colored indicates that the users B to D do not exist in the space same as the space in which the user A is performing the conference.

Note that, as will be described later, background sounds such as bird chirping and BGM are also output based on sound data obtained by the sound image localization process so that the sound image is localized at a predetermined position.

The sound to be processed by the communication management server 1 includes not only the utterance voice but also sounds such as an environmental sound and a background sound. Hereinafter, in a case where it is not necessary to distinguish the types of respective sounds, a sound to be processed by the communication management server 1 will be simply described as a sound. Actually, the sound to be processed by the communication management server 1 includes sound of a type other than a voice.

Since the voice of the uttering user is heard from the position corresponding to the position in the virtual space, the listening user can easily distinguish between the voices of the respective users even in a case where there is a plurality of participants. For example, even in a case where a plurality of users makes utterances at the same time, the listening user can distinguish between the respective voices.

Furthermore, since the voice of the uttering user can be felt stereoscopically, the listening user can obtain the feeling that the uttering user exists at the position of the sound image from the voice. The listening user can have a realistic conversation with another user.

<<Basic Operation>>

Here, a flow of basic operations of the communication management server 1 and the client terminal 2 will be described.

<Operation of Communication Management Server 1>

Figure 8:
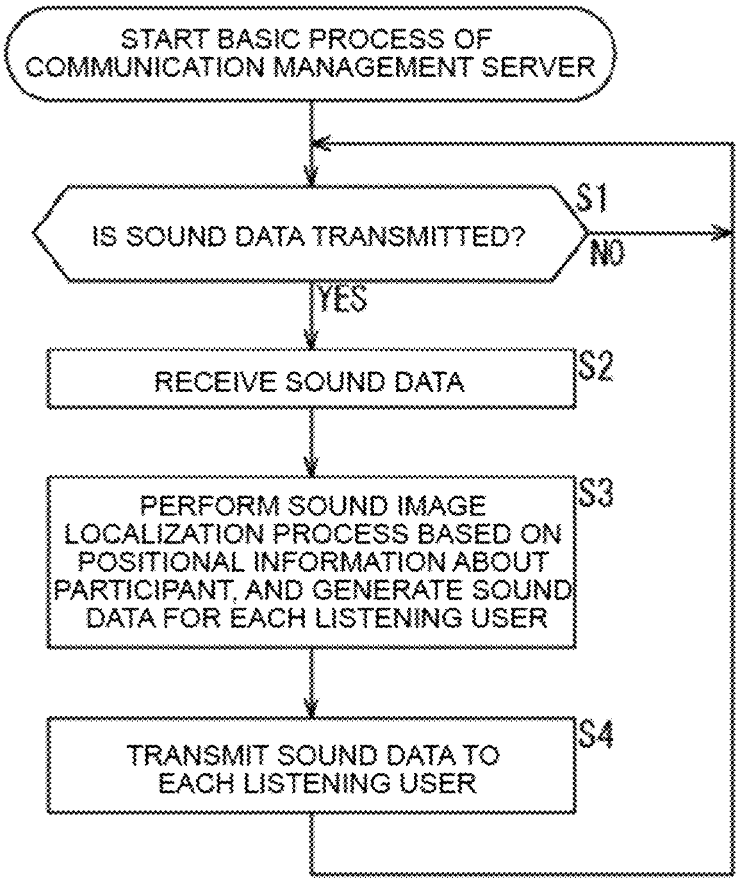
FIG. 8 is a flowchart illustrating a basic process of a communication management server.

The basic process of the communication management server 1 will be described with reference to a flowchart of FIG. 8.

In Step S1, the communication management server 1 determines whether the sound data has been transmitted from the client terminal 2, and waits until it is determined that the sound data has been transmitted.

In a case where it is determined in Step S1 that the sound data has been transmitted from the client terminal 2, in Step S2, the communication management server 1 receives the sound data transmitted from the client terminal 2.

In Step S3, the communication management server 1 performs a sound image localization process based on the positional information about each user and generates sound data for each listening user.

For example, the sound data for the user A is generated such that the sound image of the voice of the uttering user is localized at a position corresponding to the position of the uttering user when the position of the user A is used as a reference.

Furthermore, the sound data for the user B is generated such that the sound image of the voice of the uttering user is localized at a position corresponding to the position of the uttering user when the position of the user B is used as a reference.

Similarly, the sound data for another listening user is generated using the HRTF data according to the relative positional relationship with the uttering user with the position of the listening user as a reference. The sound data for respective listening users is different data.

In Step S4, the communication management server 1 transmits sound data to each listening user. The above processing is performed every time sound data is transmitted from the client terminal 2 used by the uttering user.

<Operation of Client Terminal 2>>

Figure 9:
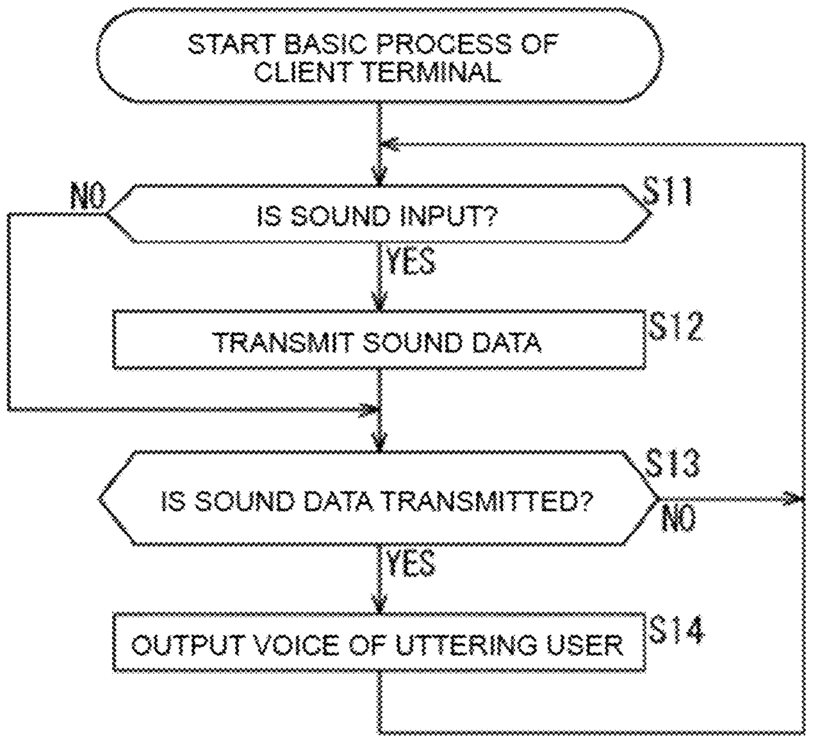
FIG. 9 is a flowchart illustrating a basic process of a client terminal.

The basic process of the client terminal 2 will be described with reference to the flowchart of FIG. 9.

In Step S11, the client terminal 2 determines whether a microphone sound has been input. The microphone sound is a sound collected by a microphone provided in the client terminal 2.

In a case where it is determined in Step S11 that the microphone sound has been input, the client terminal 2 transmits the sound data to the communication management server 1 in Step S12. In a case where it is determined in Step S11 that the microphone sound has not been input, the process of Step S12 is skipped.

In Step S13, the client terminal 2 determines whether sound data has been transmitted from the communication management server 1.

In a case where it is determined in Step S13 that the sound data has been transmitted, the communication management server 1 receives the sound data to output the voice of the uttering user in Step S14.

After the voice of the uttering user has been output, or in a case where it is determined in Step S13 that the sound data has not been transmitted, the process returns to Step S11, and the above-described processing is repeatedly performed.

<<Configuration of Each Device>>

<Configuration of Communication Management Server 1>

Figure 10:
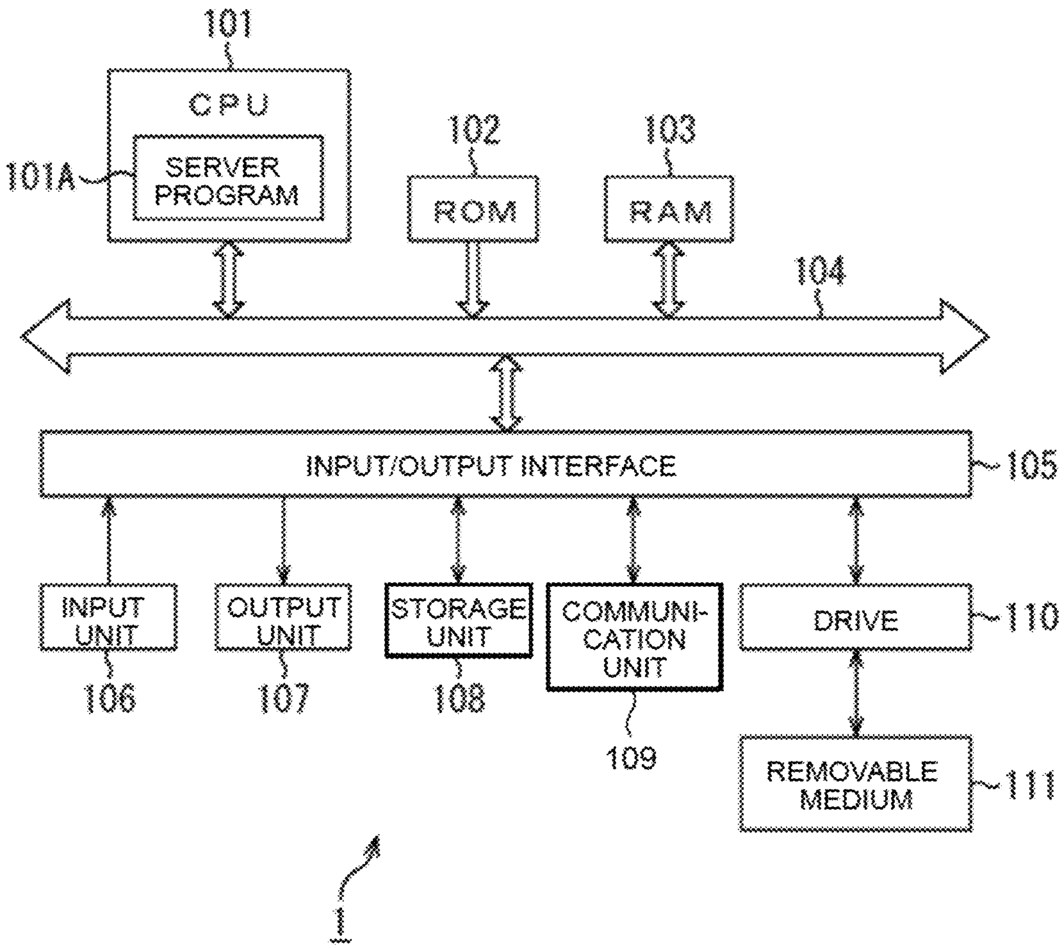
FIG. 10 is a block diagram illustrating a hardware configuration example of a communication management server.

FIG. 10 is a block diagram illustrating a hardware configuration example of a communication management server 1.

The communication management server 1 includes a computer. The communication management server 1 may include one computer having the configuration illustrated in FIG. 10 or may include a plurality of computers.

A CPU 101, a ROM 102, and a RAM 103 are connected to one another by a bus 104. The CPU 101 executes a server program 101A and controls the overall operation of the communication management server 1. The server program 101A is a program for realizing a Tele-communication system.

An input/output interface 105 is further connected to the bus 104. An input unit 106 including a keyboard, a mouse, and the like, and an output unit 107 including a display, a speaker, and the like are connected to the input/output interface 105.

Furthermore, a storage unit 108 including a hard disk, a nonvolatile memory, or the like, a communication unit 109 including a network interface or the like, and a drive 110 that drives a removable medium 111 are connected to the input/output interface 105. For example, the communication unit 109 communicates with the client terminal 2 used by each user via the network 11.

Figure 11:
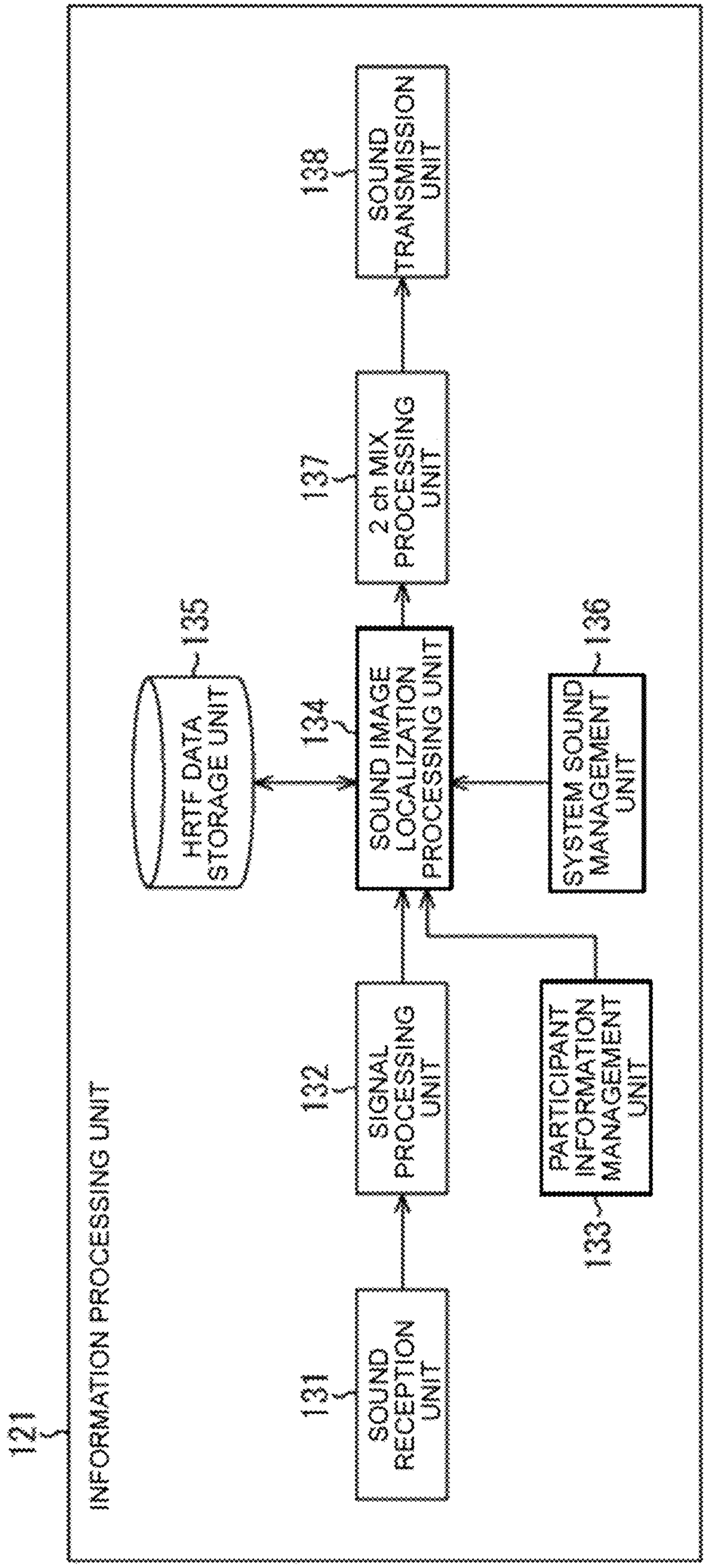
FIG. 11 is a block diagram illustrating a functional configuration example of a communication management server.

FIG. 11 is a block diagram illustrating a functional configuration example of the communication management server 1. At least some of the functional units illustrated in FIG. 11 is realized by the CPU 101 in FIG. 10 executing the server program 101A.

In the communication management server 1, an information processing unit 121 is implemented. The information processing unit 121 includes a sound reception unit 131, a signal processing unit 132, a participant information management unit 133, a sound image localization processing unit 134, an HRTF data storage unit 135, a system sound management unit 136, a 2 ch mix processing unit 137, and a sound transmission unit 138.

The sound reception unit 131 causes the communication unit 109 to receive the sound data transmitted from the client terminal 2 used by the uttering user. The sound data received by the sound reception unit 131 is output to the signal processing unit 132.

The signal processing unit 132 appropriately performs predetermined signal process on sound data supplied from the sound reception unit 131 to output sound data obtained by performing the signal process to the sound image localization processing unit 134. For example, the process of separating the voice of the uttering user and the environmental sound is performed by the signal processing unit 132. The microphone sound includes, in addition to the voice of the uttering user, an environmental sound such as noise in a space where the uttering user is located.

The participant information management unit 133 causes the communication unit 109 to communicate with the client terminal 2 or the like, thereby managing the participant information that is information about the participant of the conference.

FIG. 12 is a diagram illustrating an example of participant information.

As illustrated in FIG. 12, the participant information includes user information, positional information, setting information, and volume information.

The user information is information about a user who participates in a conference set by a certain user. For example, the user information includes a user ID and the like. Other information included in the participant information is managed in association with, for example, the user information.

The positional information is information representing the position of each user in the virtual space.

The setting information is information representing contents of setting related to the conference, such as setting of a background sound to be used in the conference.

The volume information is information representing a sound volume at the time of outputting a voice of each user.

The participant information managed by the participant information management unit 133 is supplied to the sound image localization processing unit 134. The participant information managed by the participant information management unit 133 is also supplied to the system sound management unit 136, the 2 ch mix processing unit 137, the sound transmission unit 138, and the like as appropriate. As described above, the participant information management unit 133 functions as a position management unit that manages the position of each user in the virtual space, and also functions as a background sound management unit that manages the setting of the background sound.

The sound image localization processing unit 134 reads and acquires the HRTF data according to the positional relationship of each user from the HRTF data storage unit 135 based on the positional information supplied from the participant information management unit 133. The sound image localization processing unit 134 performs a sound image localization process using the HRTF data read from the HRTF data storage unit 135 on the sound data supplied from the signal processing unit 132 to generate sound data for each listening user.

Furthermore, the sound image localization processing unit 134 performs a sound image localization process using predetermined HRTF data on the data of the system sound supplied from the system sound management unit 136. The system sound is a sound generated by the communication management server 1 and heard by the listening user together with the voice of the uttering user. The system sound includes, for example, a background sound such as BGM and a sound effect. The system sound is a sound different from the user's voice.

That is, in the communication management server 1, a sound other than the voice of the uttering user, such as a background sound or a sound effect, is also processed as the object audio. A sound image localization process for localizing a sound image at a predetermined position in the virtual space is also performed on the sound data of the system sound. For example, the sound image localization process for localizing a sound image at a position farther than the position of the participant is performed on the sound data of the background sound.

The sound image localization processing unit 134 outputs sound data obtained by performing the sound image localization process to the 2 ch mix processing unit 137. The sound data of the uttering user and the sound data of the system sound as appropriate are output to the 2 ch mix processing unit 137.

The HRTF data storage unit 135 stores HRTF data corresponding to a plurality of positions based on respective listening positions in the virtual space.

The system sound management unit 136 manages a system sound. The system sound management unit 136 outputs the sound data of the system sound to the sound image localization processing unit 134.

The 2 ch mix processing unit 137 performs a 2 ch mix process on the sound data supplied from the sound image localization processing unit 134. By performing the 2 ch mix process, channel-based audio data including the components of an audio signal L and an audio signal R of the uttering user's voice and the system sound, respectively, is generated. The sound data obtained by performing the 2 ch mix process is output to the sound transmission unit 138.

The sound transmission unit 138 causes the communication unit 109 to transmit the sound data supplied from the 2 ch mix processing unit 137 to the client terminal 2 used by each listening user.

<Configuration of Client Terminal 2>

Figure 13:
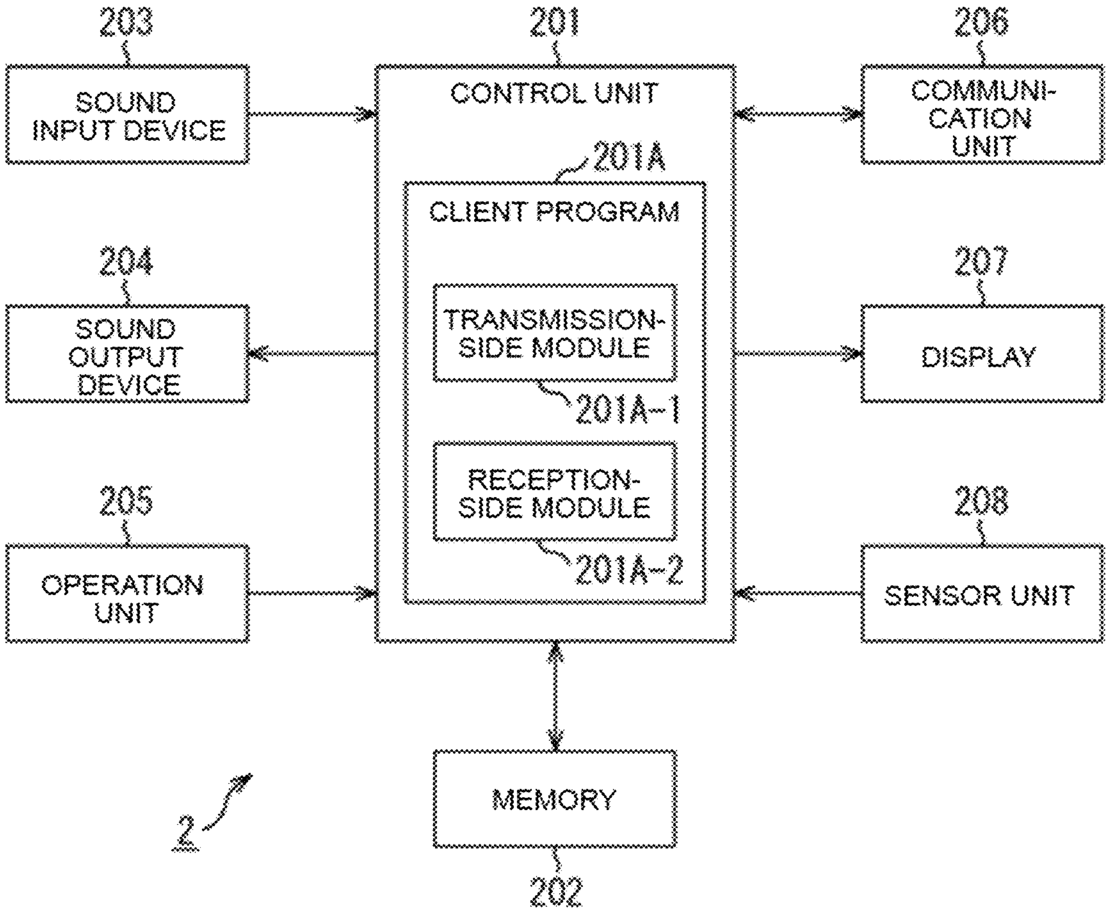
FIG. 13 is a block diagram illustrating a hardware configuration example of a client terminal.

FIG. 13 is a block diagram illustrating a hardware configuration example of the client terminal 2.

The client terminal 2 is configured by connecting a memory 202, a sound input device 203, a sound output device 204, an operation unit 205, a communication unit 206, a display 207, and a sensor unit 208 to a control unit 201.

The control unit 201 includes a CPU, a ROM, a RAM, and the like. The control unit 201 controls the entire operation of the client terminal 2 by executing a client program 201A. The client program 201A is a program for using the Telecommunication system managed by the communication management server 1. The client program 201A includes a transmission-side module 201A-1 that executes a transmission-side process and a reception-side module 201A-2 that executes a reception-side process.

The memory 202 includes a flash memory or the like. The memory 202 stores various types of information such as the client program 201A executed by the control unit 201.

The sound input device 203 includes a microphone. The sound collected by the sound input device 203 is output to the control unit 201 as a microphone sound.

The sound output device 204 includes a device such as a headphone or a speaker. The sound output device 204 outputs the voice or the like of the conference participant based on the audio signal supplied from the control unit 201.

Hereinafter, a description will be given on the assumption that the sound input device 203 is a microphone as appropriate. Furthermore, a description will be given on the assumption that the sound output device 204 is a headphone.

The operation unit 205 includes various buttons and a touch panel provided to overlap the display 207. The operation unit 205 outputs information representing the content of the user's operation to the control unit 201.

The communication unit 206 is a communication module complying with wireless communication of a mobile communication system such as 5G communication, a communication module complying with a wireless LAN, or the like. The communication unit 206 receives radio waves output from the base station and communicates with various devices such as the communication management server 1 via the network 11. The communication unit 206 receives information transmitted from the communication management server 1 to output the information to the control unit 201. Furthermore, the communication unit 206 transmits the information supplied from the control unit 201 to the communication management server 1.

The display 207 includes an organic EL display, an LCD, or the like. Various screens such as a remote conference screen are displayed on the display 207.

The sensor unit 208 includes various sensors such as an RGB camera, a depth camera, a gyro sensor, and an acceleration sensor. The sensor unit 208 outputs sensor data obtained by performing measurement to the control unit 201. The user's situation is appropriately recognized based on the sensor data measured by the sensor unit 208.

Figure 14:
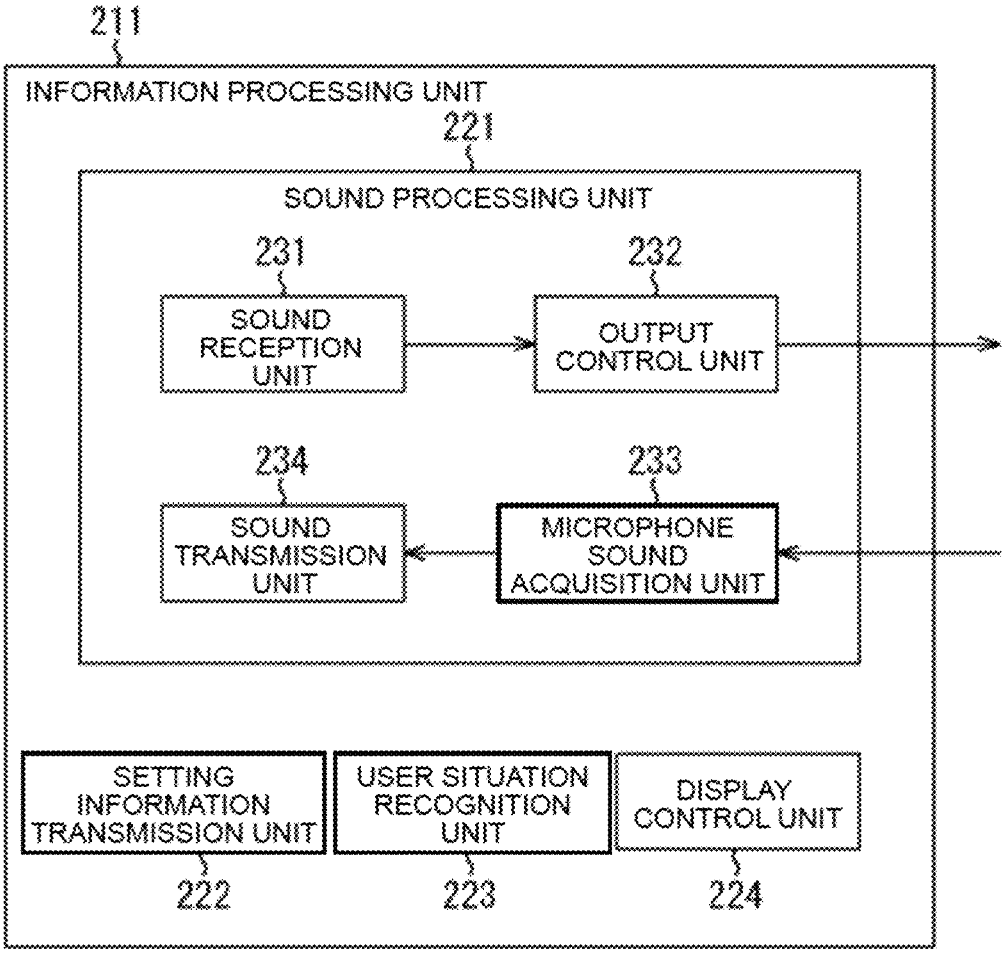
FIG. 14 is a block diagram illustrating a functional configuration example of a client terminal.

FIG. 14 is a block diagram illustrating a functional configuration example of the client terminal 2. At least some of the functional units illustrated in FIG. 14 is realized by the control unit 201 in FIG. 13 executing the client program 201A.

In the client terminal 2, an information processing unit 211 is realized. The information processing unit 211 includes a sound processing unit 221, a setting information transmission unit 222, a user situation recognition unit 223, and a display control unit 224.

The information processing unit 211 includes a sound reception unit 231, an output control unit 232, a microphone sound acquisition unit 233, and a sound transmission unit 234.

The sound reception unit 231 causes the communication unit 206 to receive the sound data transmitted from the communication management server 1. The sound data received by the sound reception unit 231 is supplied to the output control unit 232.

The output control unit 232 causes the sound output device 204 to output a sound corresponding to the sound data transmitted from the communication management server 1.

The microphone sound acquisition unit 233 acquires sound data of the microphone sound collected by the microphone constituting the sound input device 203. The sound data of the microphone sound acquired by the microphone sound acquisition unit 233 is supplied to the sound transmission unit 234.

The sound transmission unit 234 causes the communication unit 206 to transmit the sound data of the microphone sound supplied from the microphone sound acquisition unit 233 to the communication management server 1.

The setting information transmission unit 222 generates setting information representing contents of various settings according to a user's operation. The setting information transmission unit 222 causes the communication unit 206 to transmit the setting information to the communication management server 1.

The user situation recognition unit 223 recognizes the situation of the user based on the sensor data measured by the sensor unit 208. The user situation recognition unit 223 causes the communication unit 206 to transmit information representing the situation of the user to the communication management server 1.

The display control unit 224 causes the communication unit 206 to communicate with the communication management server 1, and causes the display 207 to display the remote conference screen based on the information transmitted from the communication management server 1.

<<Use Case of Sound Image Localization>>

A use case of sound image localization of various sounds including utterance voices by conference participants will be described.

<Grouping of Uttering Users>

In order to facilitate listening to a plurality of topics, each user can group uttering users. The grouping of the uttering users is performed at the predetermined timing such as before a conference starts using a setting screen displayed as a GUI on the display 207 of the client terminal 2.

Figure 15:
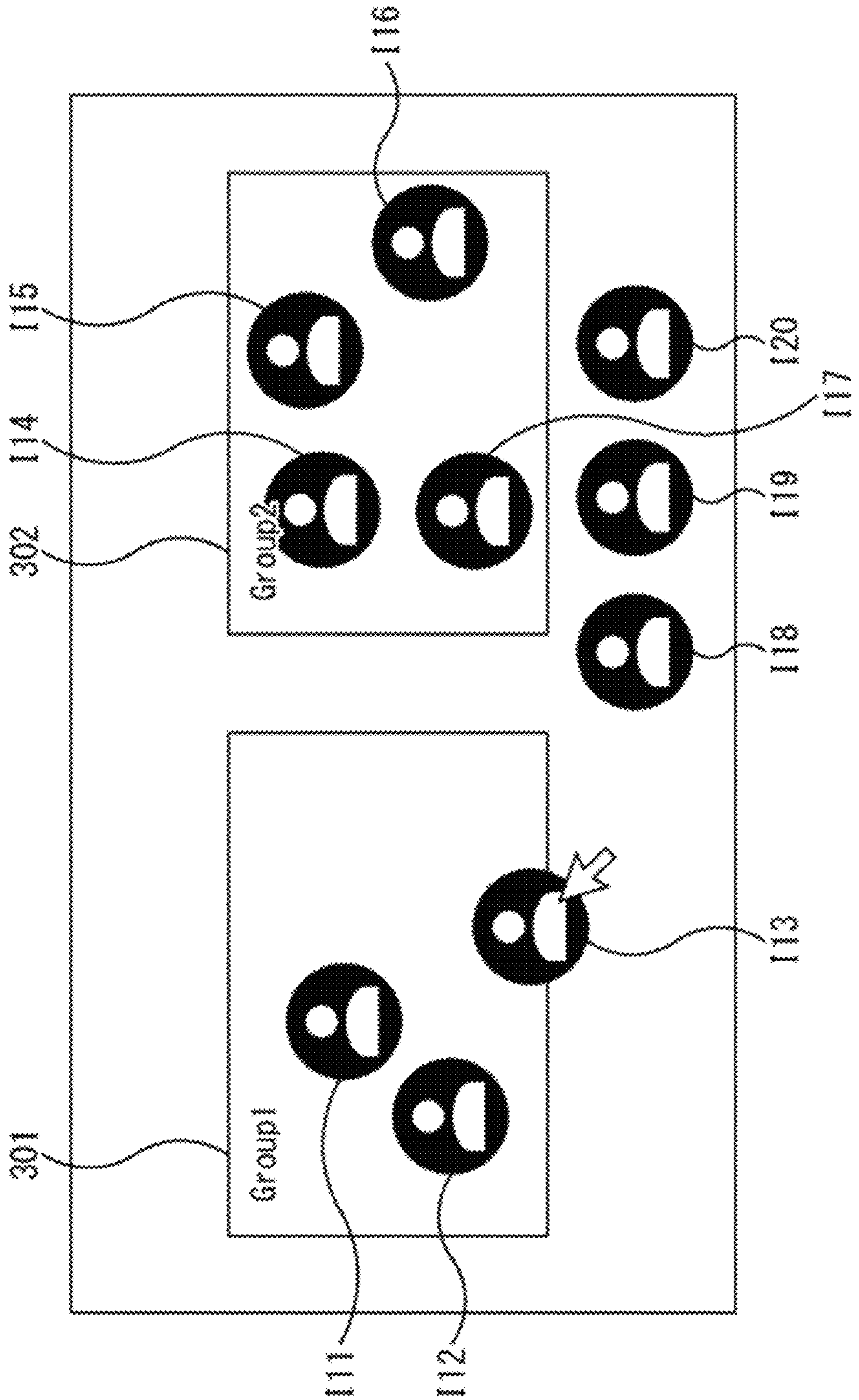
FIG. 15 is a diagram illustrating an example of a group setting screen.

FIG. 15 is a diagram illustrating an example of a group setting screen.

The setting of the group on the group setting screen is performed, for example, by moving the participant icon by dragging and dropping.

In the example of FIG. 15, a rectangular region 301 representing Group 1 and a rectangular region 302 representing Group 2 are displayed on the group setting screen. A participant icon I11 and a participant icon I12 are moved to the rectangular region 301, and a participant icon I13 is being moved to the rectangular region 301 by the cursor. In addition, the participant icons I14 to I17 are moved to the rectangular region 302.

The uttering user whose participant icon has been moved to the rectangular region 301 is a user belonging to Group 1, and the uttering user whose participant icon has been moved to the rectangular region 302 is a user belonging to Group 2. A group of uttering users is set using such a screen. Instead of moving the participant icon to the region to which the group is allocated, the group may be formed by overlapping a plurality of participant icons.

Figure 16:
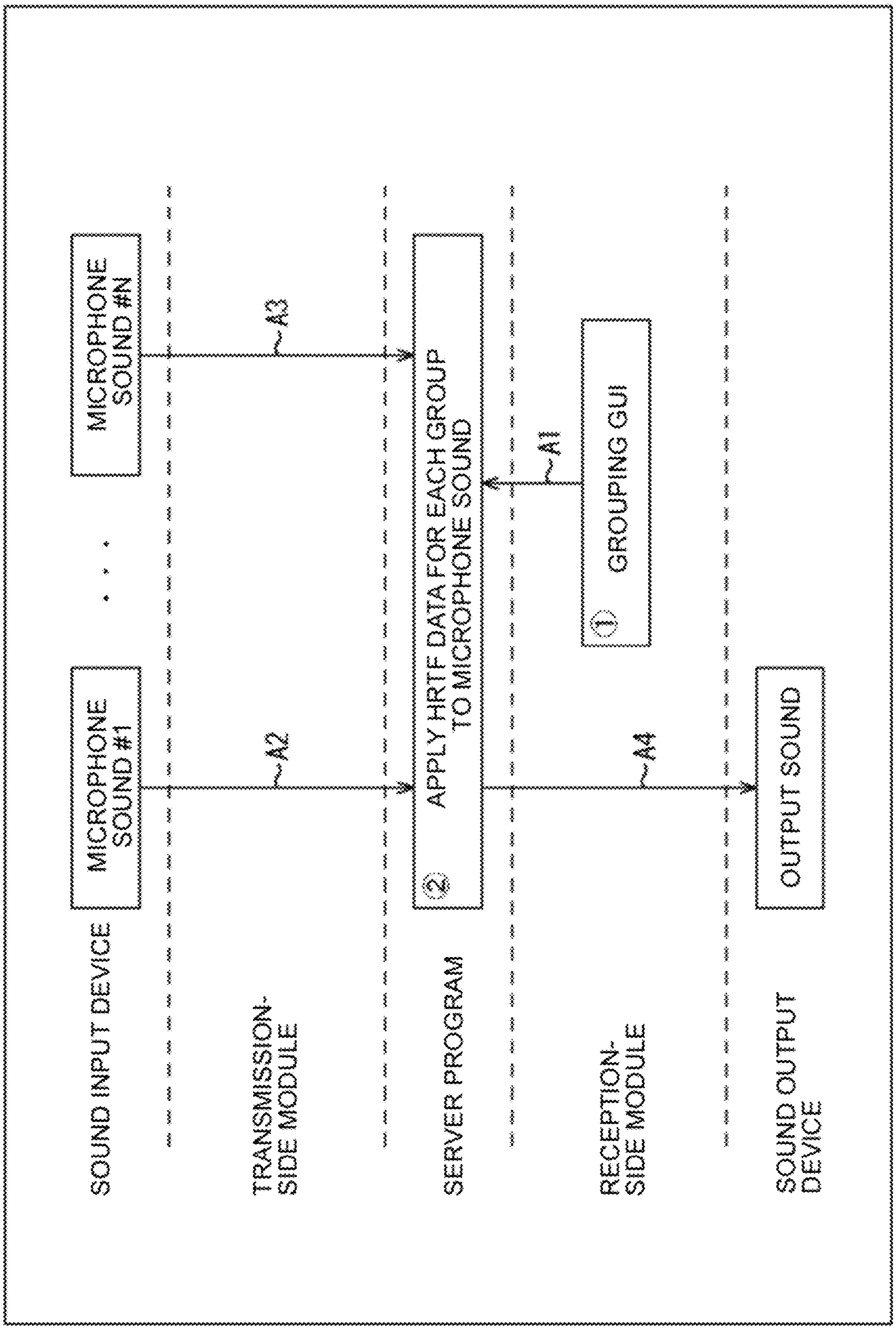
FIG. 16 is a diagram illustrating a flow of processing regarding grouping of uttering users.

FIG. 16 is a diagram illustrating a flow of processing regarding grouping of uttering users.

The group setting information that is setting information representing the group set using the group setting screen of FIG. 15 is transmitted from the client terminal 2 to the communication management server 1 as indicated by an arrow A1.

In a case where a microphone sound is transmitted from the client terminal 2 as indicated by arrows A2 and A3, the communication management server 1 performs the sound image localization process using HRTFs different between respective groups. For example, the sound image localization process using the same HRTF data is performed on the sound data of the uttering users belonging to the same group so that sounds are heard from different positions between respective groups.

The sound data generated by the sound image localization process is transmitted to and output from the client terminal 2 used by each listening user as indicated by an arrow A4.

Note that, in FIG. 16, the microphone sounds #1 to #N illustrated in the uppermost stage using a plurality of blocks are voices of uttering users detected in different client terminals 2. In addition, the sound output illustrated at the bottom stage using one block represents an output from the client terminal 2 used by one listening user.

As illustrated on the left side of FIG. 16, for example, the function indicated by the arrow A1 regarding the group setting and the transmission of the group setting information is implemented by the reception-side module 201A-2. Furthermore, the functions indicated by arrows A2 and A3 related to the transmission of the microphone sound are implemented by the transmission-side module 201A-1. The sound image localization process using the HRTF data is implemented by the server program 101A.

Figure 17:
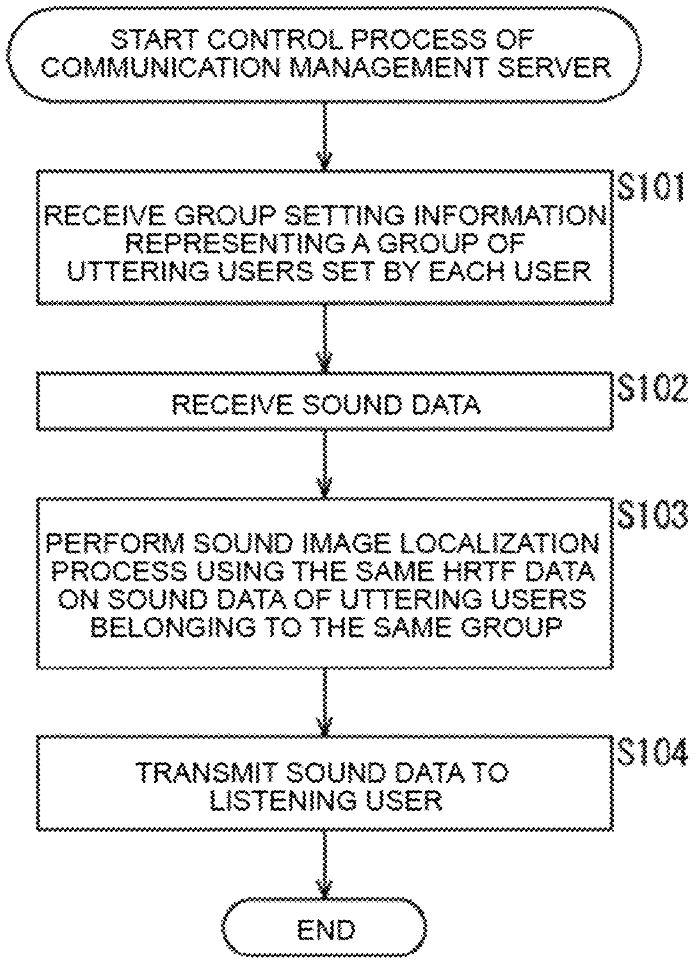
FIG. 17 is a flowchart illustrating a control process of a communication management server.

The control process of the communication management server 1 related to grouping of uttering users will be described with reference to a flowchart of FIG. 17.

In the control process of the communication management server 1, description of contents overlapping with the contents described with reference to FIG. 8 will be omitted as appropriate. The same applies to FIG. 20 and the like described later.

In Step S101, the participant information management unit 133 (FIG. 11) receives group setting information representing an utterance group set by each user. The group setting information is transmitted from the client terminal 2 in response to the setting of the group of the uttering users. In the participant information management unit 133, the group setting information transmitted from the client terminal 2 is managed in association with the information about the user who has set the group.

In Step S102, the sound reception unit 131 receives the sound data transmitted from the client terminal 2 used by the uttering user. The sound data received by the sound reception unit 131 is supplied to the sound image localization processing unit 134 via the signal processing unit 132.

In Step S103, the sound image localization processing unit 134 performs a sound image localization process using the same HRTF data on the sound data of the uttering users belonging to the same group.

In Step S104, the sound transmission unit 138 transmits the sound data obtained by the sound image localization process to the client terminal 2 used by the listening user.

In the case of the example of FIG. 15, the sound image localization process using different HRTF data is performed on the sound data of the uttering user belonging to Group 1 and the sound data of the uttering user belonging to Group 2. Furthermore, in the client terminal 2 used by the user (listening user) who has performed the group setting, the sound images of the sounds of the uttering users belonging to the respective groups of Group1 and Group2 are localized and felt at different positions.

For example, the user can easily hear each topic by setting a group for users having a conversation on the same topic.

For example, in the default state, no group is created, and participant icons representing all users are laid out at equal intervals. In this case, the sound image localization process is performed such that the sound images are localized at positions spaced apart at an equal distance according to the layout of the participant icons on the group setting screen.

<Sharing of Positional Information>

The information about the position in the virtual space may be shared among all the users. In the example described with reference to FIG. 15 and the like, each user can customize the localization of the voice of another user, whereas in this example, the position of the user set by each user is commonly used among all the users.

In this case, each user sets his/her position at the predetermined timing such as before the conference starts using a setting screen displayed as a GUI on the display 207 of the client terminal 2.

Figure 18:
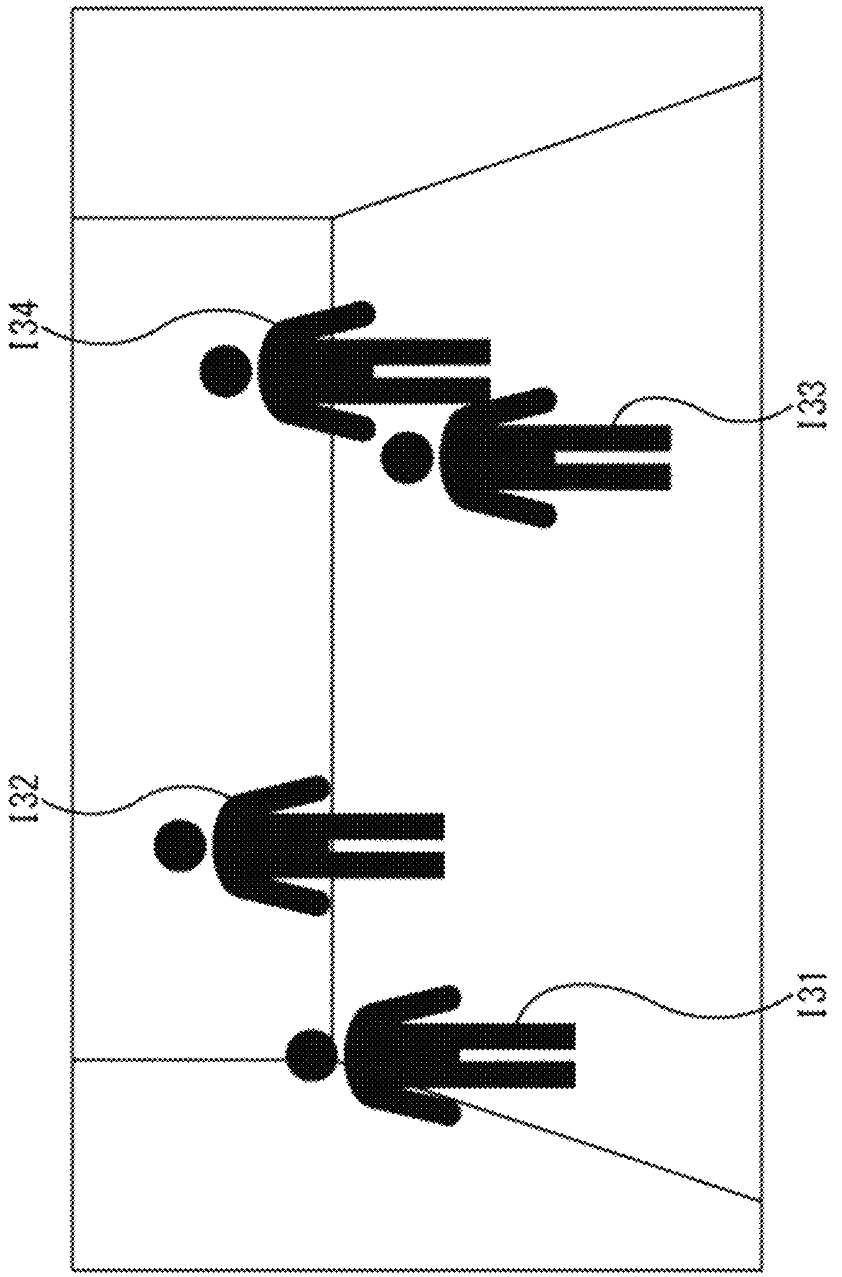
FIG. 18 is a diagram illustrating an example of a position setting screen.

FIG. 18 is a diagram illustrating an example of a position setting screen.

The three-dimensional space displayed on the position setting screen of FIG. 18 represents a virtual space. Each user moves the participant icon in the form of a person and selects a desired position. Each of participant icons I31 to I34 illustrated in FIG. 18 represents a user.

For example, in the default state, a vacant position in the virtual space is automatically set as the position of each user. A plurality of listening positions may be set, and the position of the user may be selected from the listening positions, or an any position in the virtual space may be selected.

Figure 19:
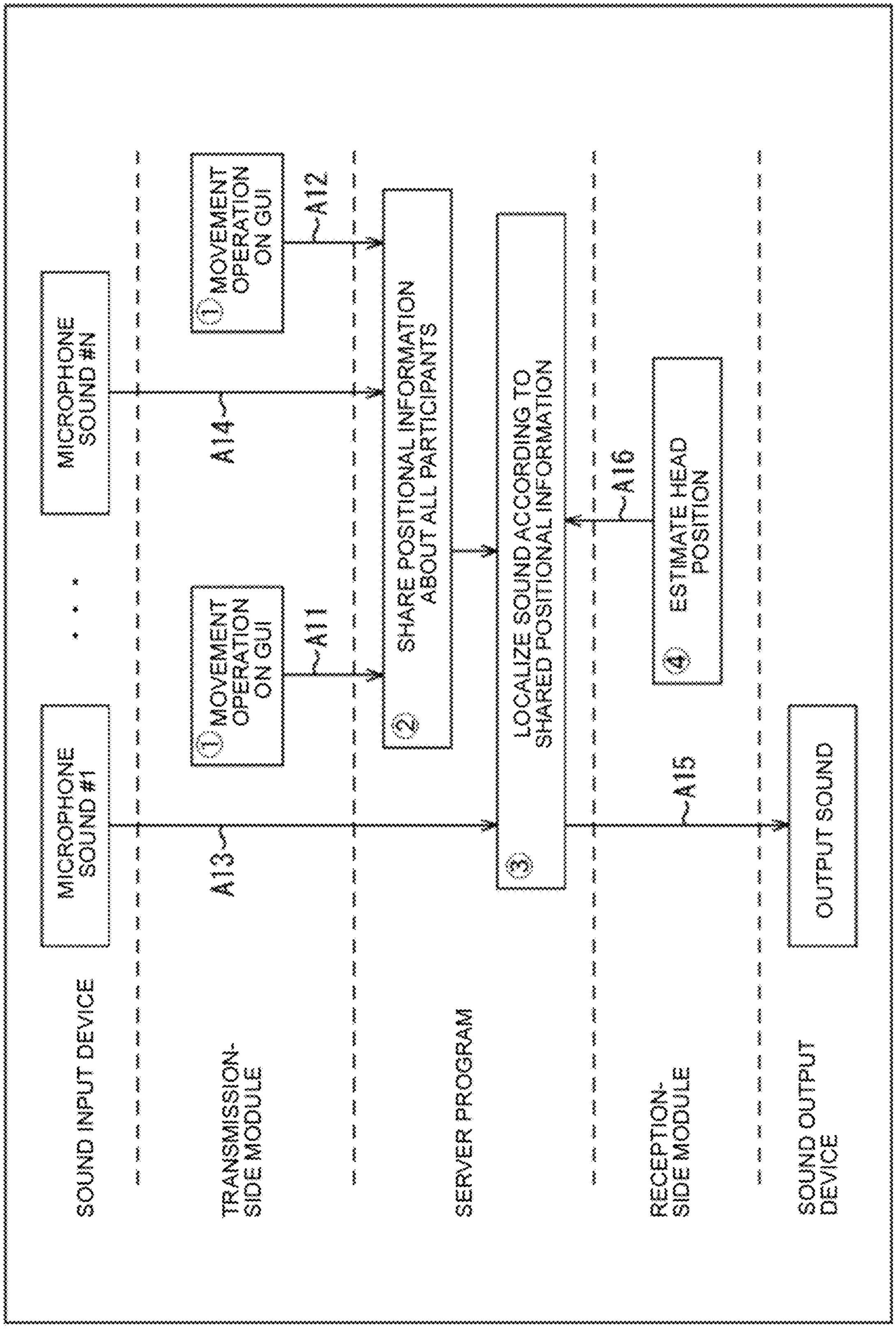
FIG. 19 is a diagram illustrating a flow of processing regarding sharing of positional information.

FIG. 19 is a diagram illustrating a flow of processing related to sharing of positional information.

The positional information representing the position in the virtual space set using the position setting screen in FIG. 18 is transmitted from the client terminal 2 used by each user to the communication management server 1 as indicated by arrows A11 and A12. In the communication management server 1, positional information about each user is managed as shared information in synchronization with setting of the position of each user.

In a case where the microphone sound is transmitted from the client terminal 2 as indicated by arrows A13 and A14, the communication management server 1 performs the sound image localization process using the HRTF data according to the positional relationship between the listening user and each uttering user based on the shared positional information.

The sound data generated by the sound image localization process is transmitted to and output from the client terminal 2 used by the listening user as indicated by an arrow A15.

In a case where the position of the head of the listening user is estimated as indicated by an arrow A16 based on the image captured by the camera provided in the client terminal 2, head tracking of the positional information may be performed. The position of the head of the listening user may be estimated based on sensor data detected by another sensor such as a gyro sensor or an acceleration sensor constituting the sensor unit 208.

For example, in a case where the head of the listening user rotates rightward by 30 degrees, the positions of the respective users are corrected by rotating the positions of all the users leftward by 30 degrees, and the sound image localization process is performed using the HRTF data corresponding to the corrected position.

Figure 20:
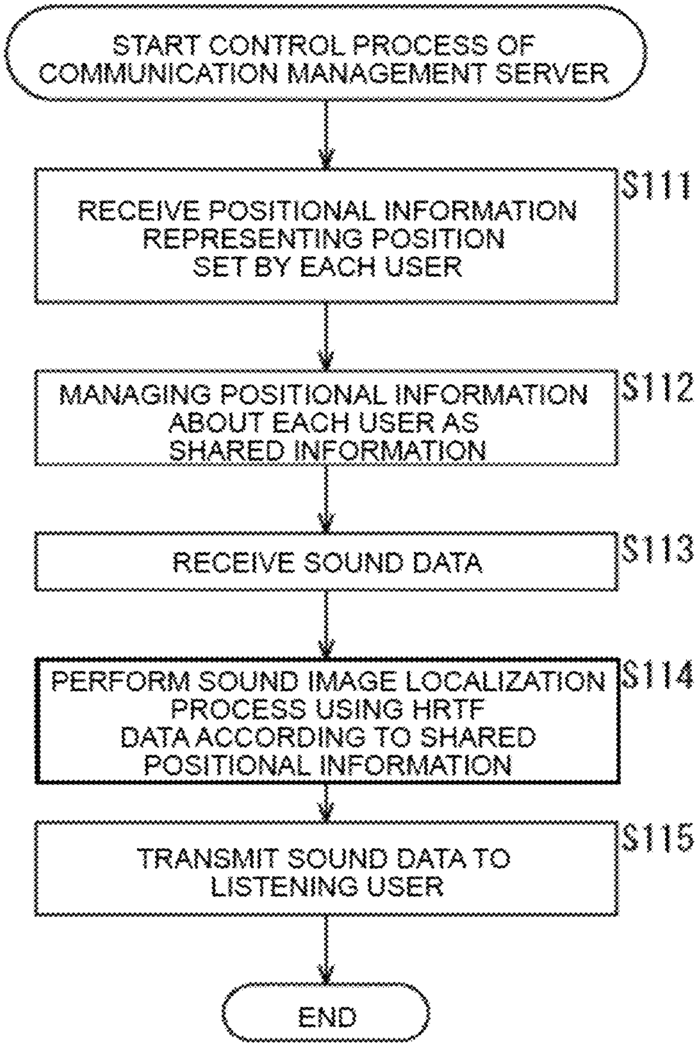
FIG. 20 is a flowchart illustrating a control process of a communication management server.

The control process of the communication management server 1 related to sharing of positional information will be described with reference to a flowchart of FIG. 20.

In Step S111, the participant information management unit 133 receives the positional information representing the position set by each user. The positional information is transmitted from the client terminal 2 used by each user in response to the setting of the position in the virtual space. In the participant information management unit 133, the positional information transmitted from the client terminal 2 is managed in association with the information about each user.

In Step S112, the participant information management unit 133 manages the positional information about each user as sharing information.

In Step S113, the sound reception unit 131 receives the sound data transmitted from the client terminal 2 used by the uttering user.

In Step S114, the sound image localization processing unit 134 reads and acquires the HRTF data according to the positional relationship between the listening user and each uttering user from the HRTF data storage unit 135 based on the shared positional information. The sound image localization processing unit 134 performs a sound image localization process using the HRTF data on the sound data of the uttering user.

In Step S115, the sound transmission unit 138 transmits the sound data obtained by the sound image localization process to the client terminal 2 used by the listening user.

With the above processing, in the client terminal 2 used by the listening user, the sound image of the voice of the uttering user is localized and felt at the position set by each uttering user.

<Setting of Background Sound>

In order to make it easy to hear the voice of the uttering user, each user can change the environmental sound included in the microphone sound to a background sound that is another sound. The background sound is set at the predetermined timing such as before a conference starts using a screen displayed as a GUI on the display 207 of the client terminal 2.

Figure 21:
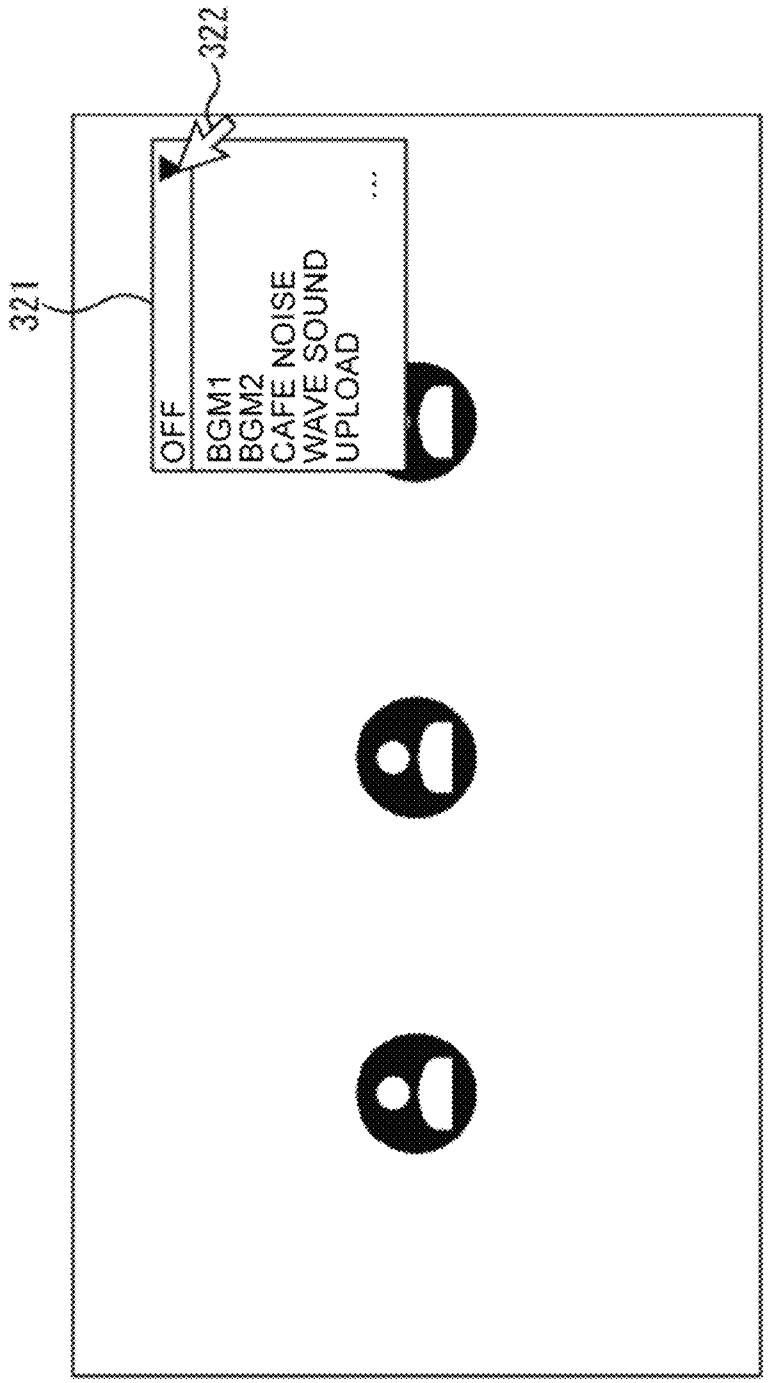
FIG. 21 is a diagram illustrating an example of a screen used for setting a background sound.

FIG. 21 is a diagram illustrating an example of a screen used for setting a background sound.

The background sound is set using, for example, a menu displayed on the remote conference screen.

In the example of FIG. 21, a background sound setting menu 321 is displayed on the upper right part of the remote conference screen. In the background sound setting menu 321, a plurality of titles of background sounds such as BGM is displayed. The user can set a predetermined sound as the background sound from among the sounds displayed in the background sound setting menu 321.

Note that, in the default state, the background sound is set to OFF. In this case, the environmental sound from the space where the uttering user is located can be heard as it is.

Figure 22:
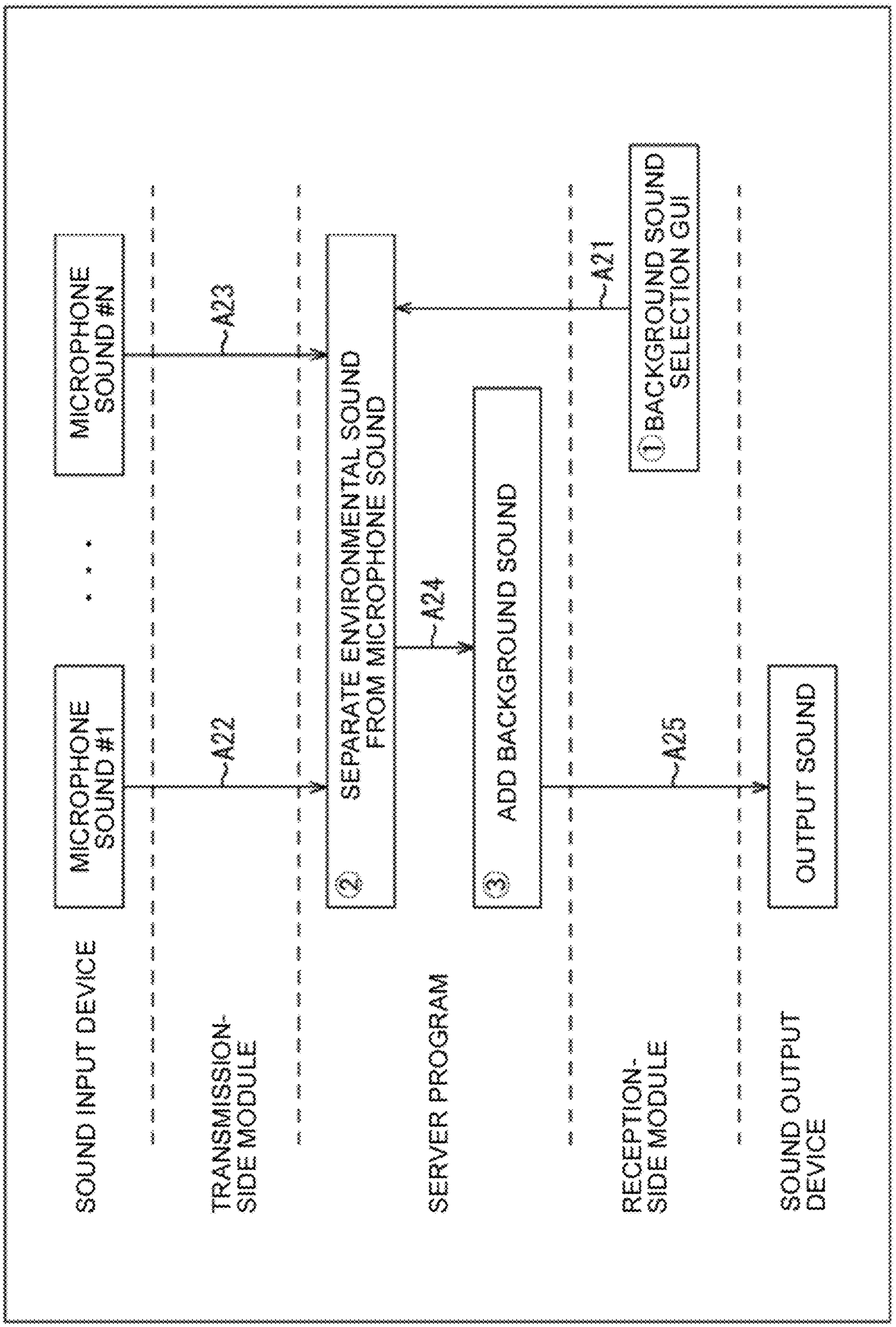
FIG. 22 is a diagram illustrating a flow of processing related to setting of a background sound.

FIG. 22 is a diagram illustrating a flow of processing related to setting of a background sound.

The background sound setting information that is the setting information representing the background sound set using the screen of FIG. 22 is transmitted from the client terminal 2 to the communication management server 1 as indicated by an arrow A21.

When microphone sounds are transmitted from the client terminal 2 as indicated by arrows A22 and A23, the environmental sound is separated from each microphone sound in the communication management server 1.

As indicated by an arrow A24, a background sound is added (synthesized) to the sound data of the uttering user obtained by separating the environmental sound, and the sound image localization process using the HRTF data according to the positional relationship is performed on each of the sound data of the uttering user and the sound data of the background sound. For example, the sound image localization process for localizing a sound image to a position farther than the position of the uttering user is performed on the sound data of the background sound.

HRTF data different between respective types of background sound (between titles) may be used. For example, in a case where a background sound of bird chirping is selected, HRTF data for localizing a sound image to a high position is used, and in a case where a background sound of wave sound is selected, HRTF data for localizing a sound image to a low position is used. In this manner, the HRTF data is prepared for each type of background sound.

The sound data generated by the sound image localization process is transmitted to and output from the client terminal 2 used by the listening user who has set the background sound as indicated by an arrow A25.

Figure 23:
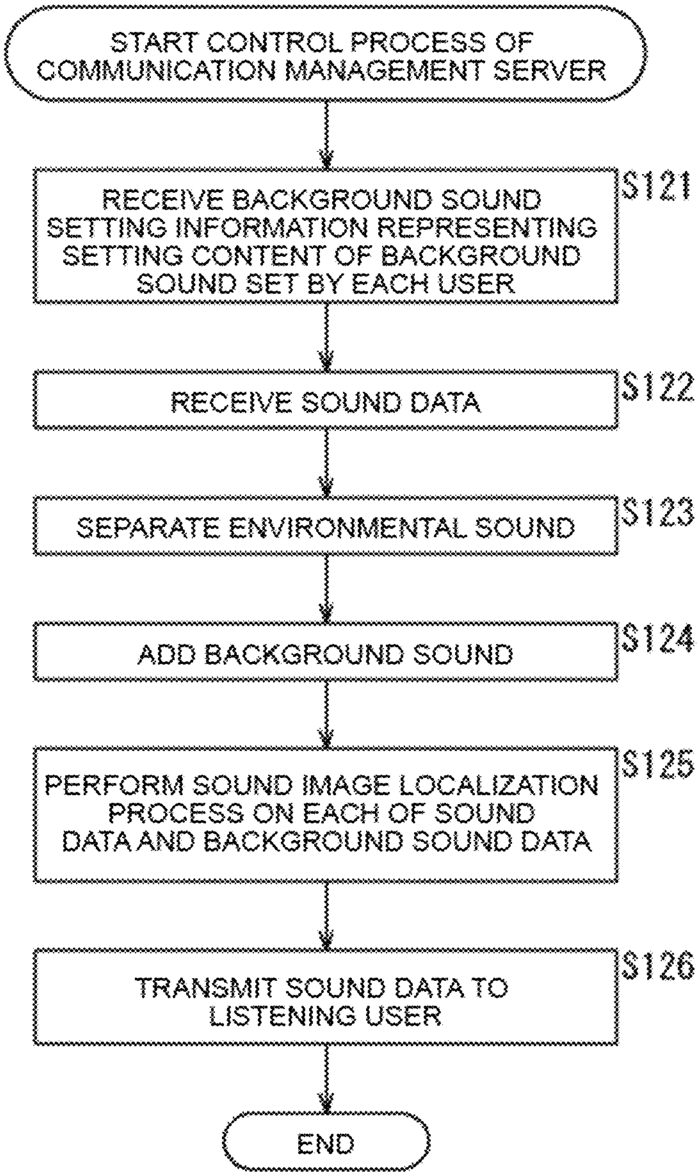
FIG. 23 is a flowchart illustrating a control process of a communication management server.

The control process of the communication management server 1 related to setting of the background sound will be described with reference to a flowchart of FIG. 23.

In Step S121, the participant information management unit 133 receives the background sound setting information representing the setting content of the background sound set by each user. The background sound setting information is transmitted from the client terminal 2 in response to the setting of the background sound. In the participant information management unit 133, the background sound setting information transmitted from the client terminal 2 is managed in association with the information about the user who has set the background sound.

In Step S122, the sound reception unit 131 receives the sound data transmitted from the client terminal 2 used by the uttering user. The sound data received by the sound reception unit 131 is supplied to the signal processing unit 132.

In Step S123, the signal processing unit 132 separates the sound data of the environmental sound from the sound data supplied from the sound reception unit 131. The sound data, of the uttering user, obtained by separating the sound data of the environmental sound is supplied to the sound image localization processing unit 134.

In Step S124, the system sound management unit 136 outputs the sound data of the background sound set by the listening user to the sound image localization processing unit 134, and adds the sound data as the sound data to be subjected to the sound image localization process.

In Step S125, the sound image localization processing unit 134 reads and acquires the HRTF data according to the positional relationship between the position of the listening user and the position of the uttering user and the HRTF data according to the positional relationship between the position of the listening user and the position of the background sound (the position where the sound image is localized) from the HRTF data storage unit 135. The sound image localization processing unit 134 performs a sound image localization process using the HRTF data for the utterance voice on the sound data of the uttering user, and performs a sound image localization process using the HRTF data for the background sound on the sound data of the background sound.

In Step S126, the sound transmission unit 138 transmits the sound data obtained by the sound image localization process to the client terminal 2 used by the listening user. The above processing is performed for each listening user.

Through the above processing, in the client terminal 2 used by the listening user, the sound image of the voice of the uttering user and the sound image of the background sound selected by the listening user are localized and felt at different positions.

The listening user can easily hear the voice of the uttering user as compared with a case where the voice of the uttering user and an environmental sound such as noise from an environment where the uttering user is present are heard from the same position. Furthermore, the listening user can have a conversation using a favorite background sound.

The background sound may not be added by the communication management server 1 but may be added by the reception-side module 201A-2 of the client terminal 2.

<Sharing of Background Sound>

The setting of the background sound such as the BGM may be shared among all the users. In the example described with reference to FIG. 21 and the like, respective users can individually set and customize the background sound to be synthesized with the voice of another user. On the other hand, in this example, the background sound set by an any user is commonly used as the background sound in a case where another user is a listening user.

In this case, an any user sets the background sound at the predetermined timing such as before the conference starts using a setting screen displayed as a GUI on the display 207 of the client terminal 2. The background sound is set using a screen similar to the screen illustrated in FIG. 21. For example, the background sound setting menu is also provided with a display for setting ON/OFF of sharing of the background sound.

In the default state, the sharing of the background sound is turned off. In this case, the voice of the uttering user can be heard as it is without synthesizing the background sound.

Figure 24:
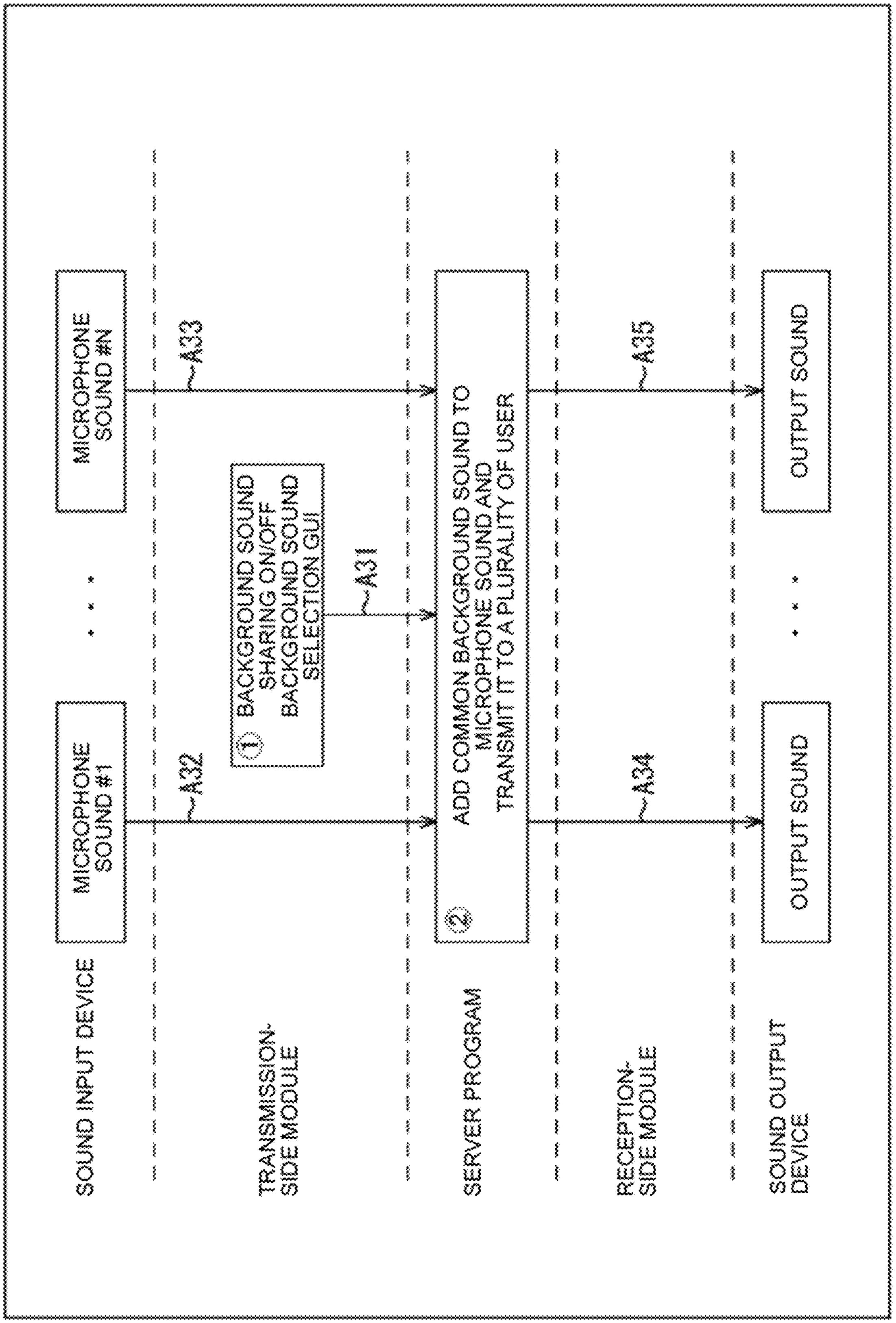
FIG. 24 is a diagram illustrating a flow of processing related to setting of a background sound.

FIG. 24 is a diagram illustrating a flow of processing related to setting of a background sound.

The background sound setting information that is setting information representing ON/OFF of sharing of the background sound and the background sound selected in a case where ON of sharing is set is transmitted from the client terminal 2 to the communication management server 1 as indicated by an arrow A31.

When microphone sounds are transmitted from the client terminal 2 as indicated by arrows A32 and A33, the environmental sound is separated from each microphone sound in the communication management server 1. The environmental sound may not be separated.

A background sound is added to the sound data of the uttering user obtained by separating the environmental sound, and the sound image localization process using the HRTF data according to the positional relationship is performed on each of the sound data of the uttering user and the sound data of the background sound. For example, the sound image localization process for localizing a sound image to a position farther than the position of the uttering user is performed on the sound data of the background sound.

The sound data generated by the sound image localization process is transmitted to and output from the client terminal 2 used by each listening user as indicated by arrows A34 and A35. In the client terminal 2 used by each listening user, the common background sound is output together with the voice of the uttering user.

The control process of the communication management server 1 regarding sharing of a background sound will be described with reference to a flowchart of FIG. 25.

Figure 25:
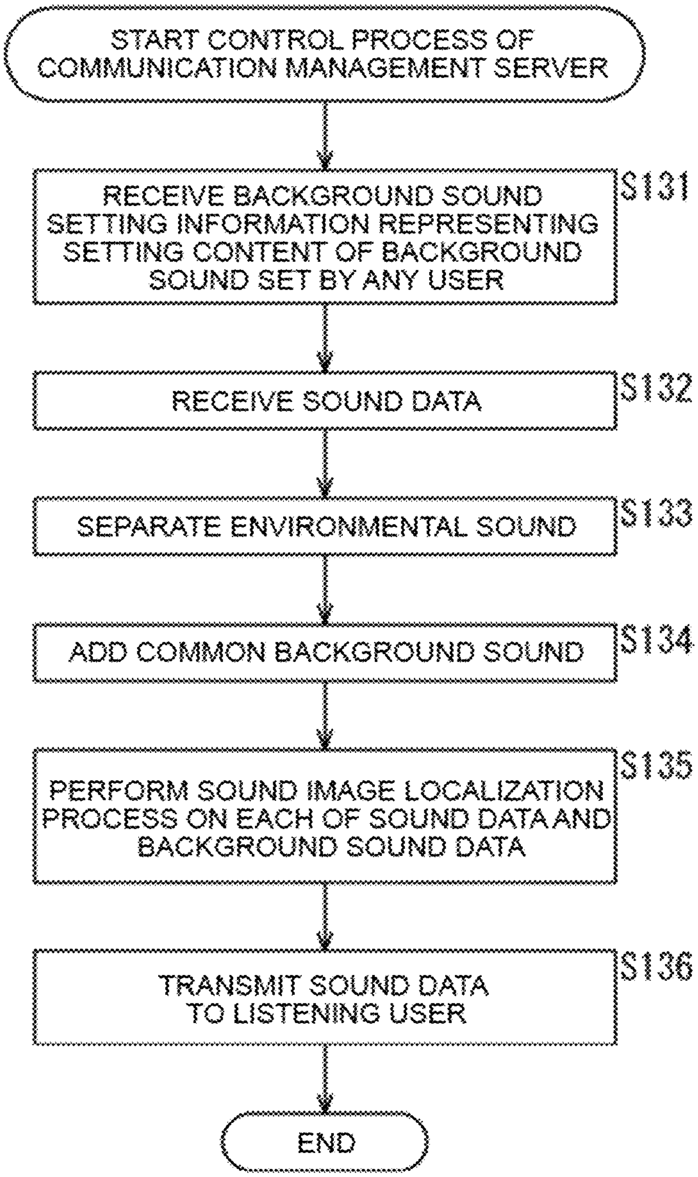
FIG. 25 is a flowchart illustrating a control process of a communication management server.

The control process illustrated in FIG. 25 is similar to the process described with reference to FIG. 23 except that respective users do not individually set the background sound but one user sets the background sound. Redundant descriptions will be omitted.

That is, in Step S131, the participant information management unit 133 receives the background sound setting information representing the setting content of the background sound set by an any user. In the participant information management unit 133, the background sound setting information transmitted from the client terminal 2 is managed in association with the user information about all the users.

In Step S132, the sound reception unit 131 receives the sound data transmitted from the client terminal 2 used by the uttering user. The sound data received by the sound reception unit 131 is supplied to the signal processing unit 132.

In Step S133, the signal processing unit 132 separates the sound data of the environmental sound from the sound data supplied from the sound reception unit 131. The sound data, of the uttering user, obtained by separating the sound data of the environmental sound is supplied to the sound image localization processing unit 134.

In Step S134, the system sound management unit 136 outputs the sound data of the common background sound to the sound image localization processing unit 134 and adds it as the sound data to be subjected to the sound image localization process.

In Step S135, the sound image localization processing unit 134 reads and acquires the HRTF data according to the positional relationship between the position of the listening user and the position of the uttering user and the HRTF data according to the positional relationship between the position of the listening user and the position of the background sound from the HRTF data storage unit 135. The sound image localization processing unit 134 performs a sound image localization process using the HRTF data for the utterance voice on the sound data of the uttering user, and performs a sound image localization process using the HRTF data for the background sound on the sound data of the background sound.

In Step S136, the sound transmission unit 138 transmits the sound data obtained by the sound image localization process to the client terminal 2 used by the listening user.

Through the above processing, in the client terminal 2 used by the listening user, the sound image of the voice of the uttering user and the sound image of the background sound commonly used in the conference are localized and felt at different positions.

The background sound may be shared as follows.

(A) In a case where a plurality of people simultaneously listen to the same lecture in a virtual lecture hall, the sound image localization process is performed so as to localize the speaker's voice far as a common background sound and localize the user's voice close. A sound image localization process such as rendering in consideration of the relationship between the positions of the respective users and the spatial sound effects is performed on the voice of the uttering user.

(B) In a case where a plurality of people simultaneously watch the movie content in a virtual movie theater, the sound image localization process is performed so as to localize the sound of the movie content, which is a common background sound, near the screen. The sound image localization process such as rendering in consideration of the relationship between the position of the seat in the movie theater and the position of the screen selected as the user's seat by each user and the sound effects of the movie theater is performed on the voice of the movie content.

(C) An environmental sound from a space where a certain user is present is separated from a microphone sound and used as a common background sound. In this case, respective users listen to the same sound as the environmental sound from the space in which other users are present together with the voice of the uttering user. As a result, the environmental sound from an any space can be shared by all the users.

<Dynamic Switching of Sound Image Localization Process>

Whether the sound image localization process, which is process of the object audio including rendering and the like, is performed by the communication management server 1 or the client terminal 2 is dynamically switched.

In this case, of the configurations of the communication management server 1 illustrated in FIG. 11, at least the configuration same as that of the sound image localization processing unit 134, the HRTF data storage unit 135, and the 2 ch mix processing unit 137 are provided in the client terminal 2. The configuration similar to that of the sound image localization processing unit 134, the HRTF data storage unit 135, and the 2 ch mix processing unit 137 are realized by, for example, the reception-side module 201A-2.

In a case where the setting of the parameter used for the sound image localization process such as the positional information about the listening user is changed during the conference and the change is reflected in the sound image localization process in real time, the sound image localization process is performed by the client terminal 2. By performing the sound image localization process locally, it is possible to make a response to the parameter change quick.

On the other hand, in a case where the parameter setting is not changed for a certain period of time or more, the sound image localization process is performed by the communication management server 1. By performing the sound image localization process by the server, the amount of data communication between the communication management server 1 and the client terminal 2 can be suppressed.

Figure 26:
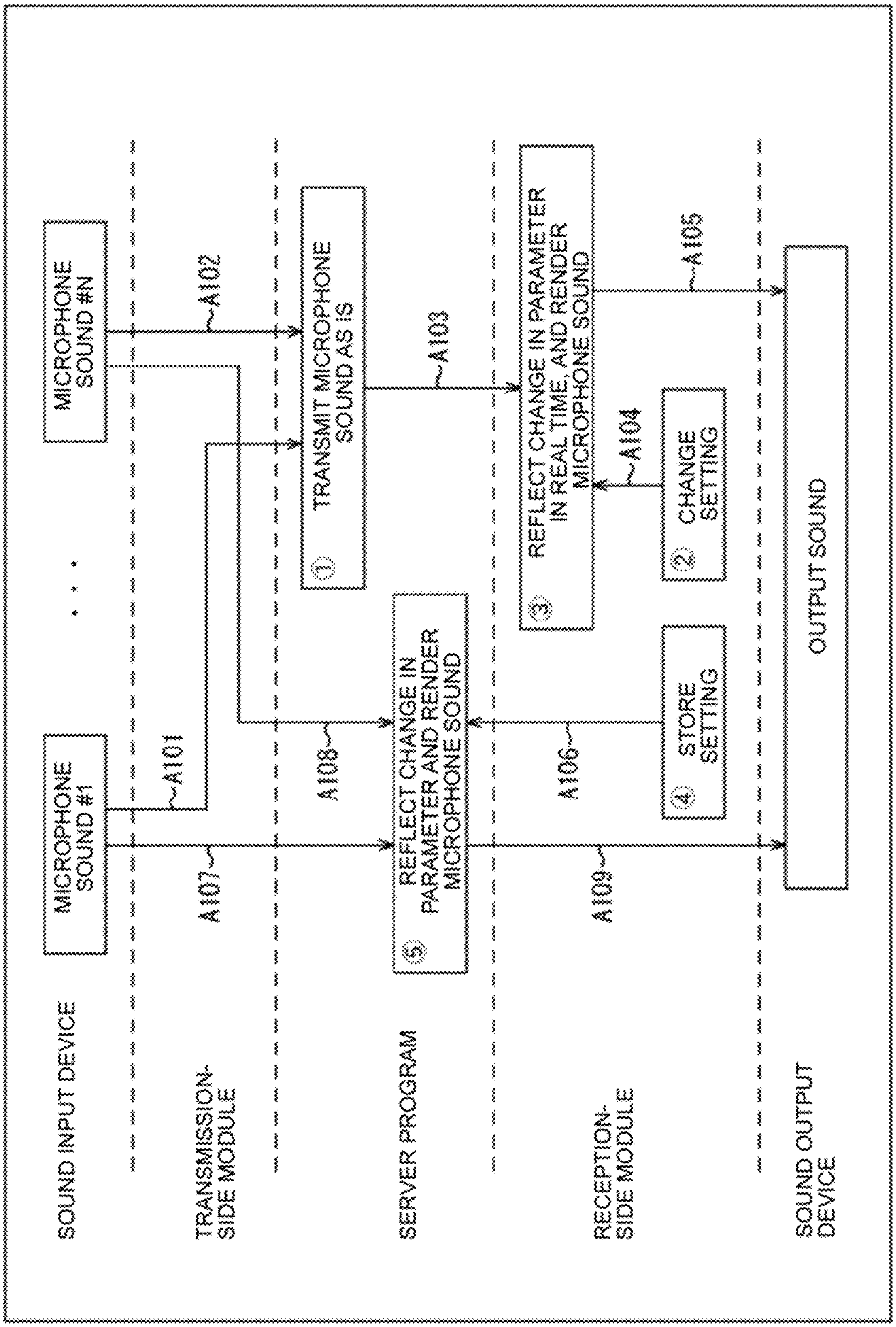
FIG. 26 is a diagram illustrating a flow of processing related to dynamic switching of the sound image localization process.

FIG. 26 is a diagram illustrating a flow of processing related to dynamic switching of the sound image localization process.

In a case where the sound image localization process is performed by the client terminal 2, the microphone sound transmitted from the client terminal 2 as indicated by arrows A101 and A102 is directly transmitted to the client terminal 2 as indicated by arrow A103. The client terminal 2 serving as the transmission source of the microphone sound is the client terminal 2 used by the uttering user, and the client terminal 2 serving as the transmission destination of the microphone sound is the client terminal 2 used by the listening user.

In a case where the setting of the parameter related to the localization of the sound image, such as the position of the listening user, is changed by the listening user as indicated by an arrow A104, the change in the setting is reflected in real time, and the sound image localization process is performed on the microphone sound transmitted from the communication management server 1.

A sound corresponding to the sound data generated by the sound image localization process by the client terminal 2 is output as indicated by an arrow A105.

In the client terminal 2, a change content of the parameter setting is saved, and information representing the change content is transmitted to the communication management server 1 as indicated by an arrow A106.

In a case where the sound image localization process is performed by the communication management server 1, as indicated by arrows A107 and A108, the sound image localization process is performed on the microphone sound transmitted from the client terminal 2 by reflecting the changed parameter.

The sound data generated by the sound image localization process is transmitted to and output from the client terminal 2 used by the listening user as indicated by an arrow A109.

Figure 27:
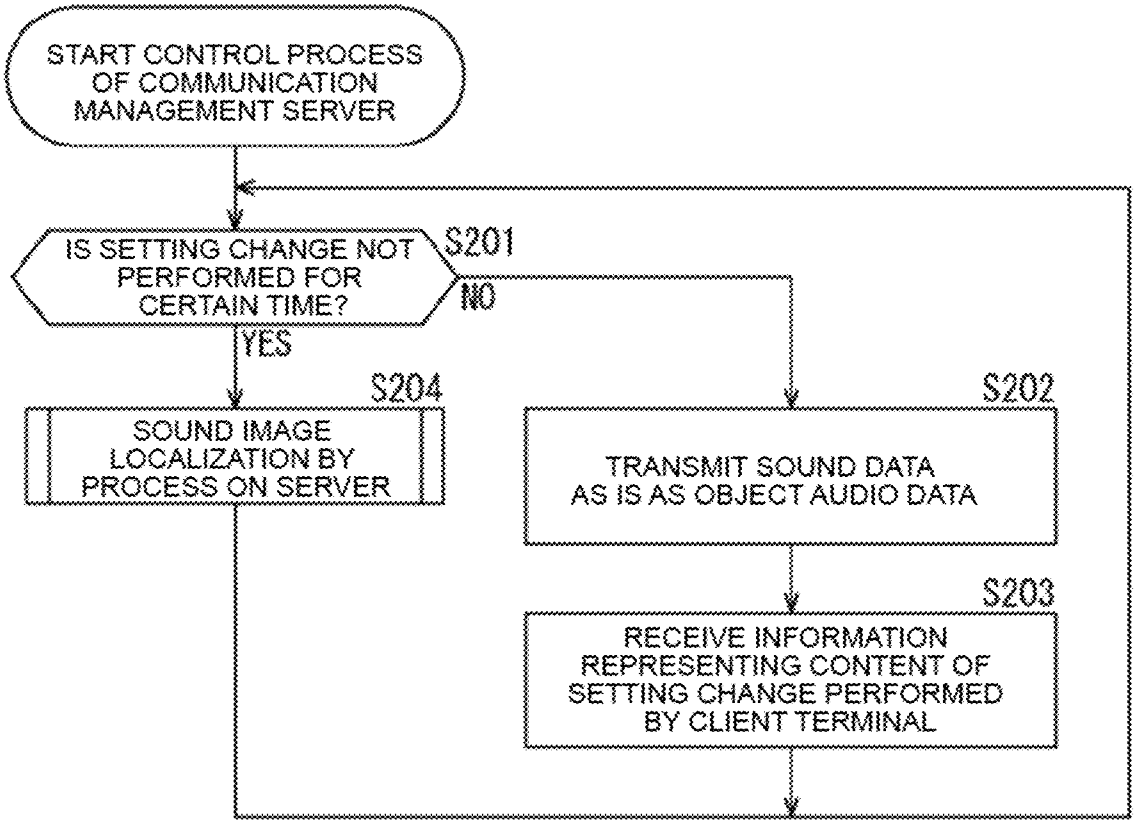
FIG. 27 is a flowchart illustrating a control process of a communication management server.

The control process of the communication management server 1 related to dynamic switching of the sound image localization process will be described with reference to a flowchart of FIG. 27.

In Step S201, it is determined whether the parameter setting change has not been made for a certain period of time or more. This determination is made by the participant information management unit 133 based on, for example, information transmitted from the client terminal 2 used by the listening user.

In a case where it is determined in Step S201 that there is a parameter setting change, in Step S202, the sound transmission unit 138 transmits the sound data of the uttering user received by the participant information management unit 133 as it is to the client terminal 2 used by the listening user. The transmitted sound data is object audio data.

In the client terminal 2, the sound image localization process is performed using the changed setting, and sound is output. Furthermore, information representing the content of the changed setting is transmitted to the communication management server 1.

In Step S203, the participant information management unit 133 receives the information, representing the content of the setting change, transmitted from the client terminal 2. After the positional information about the listening user is updated based on the information transmitted from the client terminal 2, the process returns to Step S201, and the subsequent processes are performed. The sound image localization process performed by the communication management server 1 is performed based on the updated positional information.

On the other hand, in a case where it is determined in Step S201 that there is no parameter setting change, a sound image localization process is performed by the communication management server 1 in Step S204. The processing performed in Step S204 is basically similar to the processing described with reference to FIG. 8.

The above processing is performed not only in a case where the position is changed but also in a case where another parameter such as the setting of the background sound is changed.

<Management of Sound Effect Setting>

The sound effect setting suitable for the background sound may be stored in a database and managed by the communication management server 1. For example, a position suitable as a position at which a sound image is localized is set for each type of background sound, and the HRTF data corresponding to the set position is stored. Parameters related to another sound effect setting such as reverb may be stored.

Figure 28:
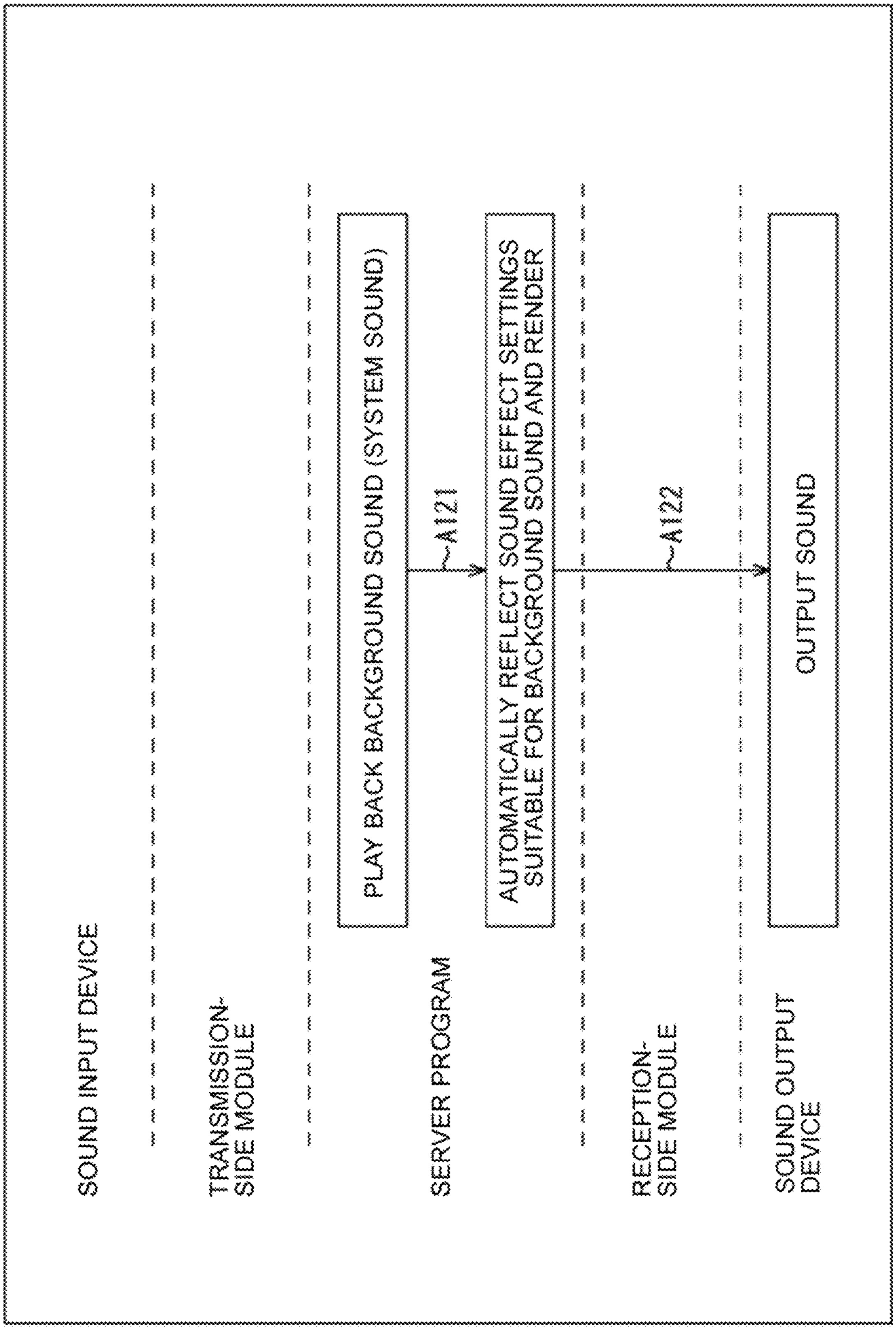
FIG. 28 is a diagram illustrating a flow of processing regarding management of sound effect setting.

FIG. 28 is a diagram illustrating a flow of processing related to management of the sound effect setting.

In a case where the background sound is synthesized with the voice of the uttering user, in the communication management server 1, the background sound is played back, and as indicated by an arrow A121, the sound image localization process is performed using the sound effect setting such as HRTF data suitable for the background sound.

The sound data generated by the sound image localization process is transmitted to and output from the client terminal 2 used by the listening user as indicated by an arrow A122.

Modification

Although the conversation held by a plurality of users is assumed to be a conversation in a remote conference, the above-described technology can be applied to various types of conversations as long as the conversation is a conversation in which a plurality of people participates via online, such as a conversation in a meal scene or a conversation in a lecture.

About Program

The above-described series of processing can be executed by hardware or software. In a case where the series of processing is executed by software, a program constituting the software is installed in a computer incorporated in dedicated hardware, a general-purpose personal computer, or the like.

The program to be installed is recorded in the removable medium 111 illustrated in FIG. 10 including an optical disk (compact disc-read only memory (CD-ROM), digital versatile disc (DVD), and the like), a semiconductor memory, and the like. Furthermore, the program may be provided via a wired or wireless transmission medium such as a local area network, the Internet, or digital broadcasting. The program can be installed in the ROM 102 or the storage unit 108 in advance.

Note that the program executed by the computer may be a program in which processing is performed in time series in the order described in the present specification, or may be a program in which processing is performed in parallel or at necessary timing such as when a call is made.

Note that, in the application, the system means a set of a plurality of components (devices, modules (parts), etc.), and it does not matter whether all the components are in the same housing. Therefore, a plurality of devices housed in respective housings and connected via a network is a system and one device in which a plurality of modules is housed in one housing is a system.

The effects described in the present identification are merely examples and are not limited, and other effects may be present.

The embodiments of the present technology are not limited to the above-described embodiments, and various modifications can be made without departing from the gist of the present technology. Although the headphone or the speaker is used as the sound output device, other devices may be used. For example, a normal earphone (inner ear headphone) or an open-type earphone capable of capturing an environmental sound can be used as the sound output device.

Furthermore, for example, the technique can adopt a configuration of cloud computing in which one function is shared and processed by a plurality of devices in cooperation via a network.

Furthermore, each step described in the above-described flowchart can be executed by one device or can be shared and executed by a plurality of devices.

Furthermore, in a case where a plurality of processes is included in one step, the plurality of processes included in the one step can be executed by one device or can be shared and executed by a plurality of devices.

Example of Combination of Configurations

The present technology can also have the following configurations.

(1)

An information processing device comprising:

a storage unit that stores HRTF data corresponding to a plurality of positions based on a listening position; and a sound image localization processing unit that performs a sound image localization process based on the HRTF data corresponding to a position, in a virtual space, of a participant participating in a conversation via a network and sound data of the participant.

(2)

The information processing device according to (1), wherein the sound image localization processing unit performs the sound image localization process on sound data of an utterer by using the HRTF data according to a relationship between a position of the participant who is a listener and a position of the participant who is the utterer.

(3)

The information processing device according to (2), further comprising:

a transmission processing unit that transmits, to a terminal used by each of the listeners, sound data, of the utterer, obtained by performing the sound image localization process.

(4)

The information processing device according to any one of (1) to (3), further comprising:

a position management unit that manages a position of each of the participants in a virtual space based on a position of visual information visually representing each of the participants on a screen displayed on a terminal used by each of the participants.

(5)

The information processing device according to (4), wherein the position management unit forms a group of the participants according to setting by the participants, and wherein the sound image localization processing unit performs the sound image localization process using the same HRTF data on sound data of the participants belonging to the same group.

(6)

The information processing device according to (3), wherein the sound image localization processing unit performs the sound image localization process using the HRTF data corresponding to a predetermined position in a virtual space on data of a background sound that is a sound different from a voice of the participant, and wherein the transmission processing unit transmits, to a terminal used by the listener, data of the background sound obtained by the sound image localization process together with sound data of the utterer.

(7)

The information processing device according to (6), further comprising:

a background sound management unit that selects the background sound according to setting by the participant.

(8)

The information processing device according to (7), wherein the transmission processing unit transmits data of the background sound to a terminal used by the listener who has selected the background sound.

(9)

The information processing device according to (7), wherein the transmission processing unit transmits data of the background sound to terminals used by all the participants including the participant who has selected the background sound.

(10)

The information processing device according to (1), further comprising:

a position management unit that manages a position of each of the participants in a virtual space as a position commonly used among all the participants.

(11)

An information processing method comprising:

by an information processing device, storing HRTF data corresponding to a plurality of positions based on a listening position; and performing a sound image localization process based on the HRTF data corresponding to a position, in a virtual space, of a participant participating in a conversation via a network and sound data of the participant.

(12)

A program for causing a computer to execute the processes of:

storing HRTF data corresponding to a plurality of positions based on a listening position; and performing a sound image localization process based on the HRTF data corresponding to a position, in a virtual space, of a participant participating in a conversation via a network and sound data of the participant.

(13)

An information processing terminal comprising:

a sound reception unit that receives sound data of a participant who is an utterer obtained by performing a sound image localization process, the sound data being transmitted from an information processing device that stores HRTF data corresponding to a plurality of positions based on a listening position and performs the sound image localization process based on the HRTF data corresponding to a position, in a virtual space, of the participant participating in a conversation via a network and sound data of the participant, and outputs a voice of the utterer.

(14)

The information processing terminal according to (13), further comprising:

a sound transmission unit that transmits sound data of a user of the information processing terminal as sound data of the utterer to the information processing device.

(15)

The information processing terminal according to (13) or (14), further comprising:

a display control unit that displays visual information visually representing the participants at positions corresponding to positions of the respective participants in a virtual space.

(16)

The information processing terminal according to any one of (13) to (15), further comprising:

a setting information generation unit that transmits, to the information processing device, setting information, representing a group of the participants, set by a user of the information processing terminal, wherein the sound reception unit receives sound data of the utterer obtained by the information processing device by performing the sound image localization process using the same HRTF data on sound data of the participants belonging to the same group.

(17)

The information processing terminal according to any one of (13) to (15), further comprising:

a setting information generation unit that transmits, to the information processing device, setting information representing a type of a background sound that is a sound different from a voice of the participant, the setting information being selected by a user of the information processing terminal, wherein the sound reception unit receives, together with sound data of the utterer, data of the background sound obtained by the information processing device by performing the sound image localization process using the HRTF data corresponding to a predetermined position in a virtual space on data of the background sound.

(18)

An information processing method comprising:

by information processing terminal, receiving sound data of a participant who is an utterer obtained by performing a sound image localization process, the sound data being transmitted from an information processing device that stores HRTF data corresponding to a plurality of positions based on a listening position and performs the sound image localization process based on the HRTF data corresponding to a position, in a virtual space, of the participant participating in a conversation via a network and sound data of the participant, and outputting a voice of the utterer.

(19)

A program for causing a computer to execute the processes of:

receiving sound data of a participant who is an utterer obtained by performing a sound image localization process, the sound data being transmitted from an information processing device that stores HRTF data corresponding to a plurality of positions based on a listening position and performs the sound image localization process based on the HRTF data corresponding to a position, in a virtual space, of the participant participating in a conversation via a network and sound data of the participant, and outputting a voice of the utterer.

REFERENCE SIGNS LIST

1 COMMUNICATION MANAGEMENT SERVER
2A to 2D CLIENT TERMINAL
121 INFORMATION PROCESSING UNIT
131 SOUND RECEPTION UNIT
132 SIGNAL PROCESSING UNIT
133 PARTICIPANT INFORMATION MANAGEMENT UNIT
134 SOUND IMAGE LOCALIZATION PROCESSING UNIT
135 HRTF DATA STORAGE UNIT
136 SYSTEM SOUND MANAGEMENT UNIT
137 2 ch MIX PROCESSING UNIT
138 SOUND TRANSMISSION UNIT
201 CONTROL UNIT
211 INFORMATION PROCESSING UNIT
221 SOUND PROCESSING UNIT
222 SETTING INFORMATION TRANSMISSION UNIT
223 USER SITUATION RECOGNITION UNIT
231 SOUND RECEPTION UNIT
233 MICROPHONE SOUND ACQUISITION UNIT

The invention claimed is:

1. An information processing device comprising:

circuitry configured to:

acquire position information corresponding to each user of a plurality of users in a virtual space set up by each user and sound data from each of a plurality of uttering users participating in a conversation via a network;

store head-related transfer function (HRTF) data corresponding to a plurality of positions of each of the plurality of uttering users based on a position of a listening user;

perform a sound image localization process for the plurality of users based on a relative positional relationship between the position of the listening user of the plurality of users and the position of each uttering user of the plurality of users in the virtual space;

generate audio data corresponding to each listening user of the plurality of users based on the sound image localization process;

acquire group setting information which is information grouping the uttering users set by each of the users, wherein the group setting information is stored in association with information of each of the users who set up a group; and perform the sound localization process for the plurality of users using the same HRTF for sound data of the uttering users belonging to the same group in the group setting information corresponding to the each listening user of the plurality of users.

2. The information processing device according to claim 1, wherein the sound image localization process on the sound data of the utterer is performed by using the HRTF data according to a relationship between a position of the participant who is a listener and a position of the participant who is the utterer.

3. The information processing device according to claim 2, further comprising:

circuitry configured to:

transmit, to a plurality of client terminals used by each of the listeners, sound data, of the utterer, obtained by performing the sound image localization process.

4. The information processing device according to claim 3, wherein the sound image localization process is performed using the HRTF data corresponding to a predetermined position in a virtual space on data of a background sound that is a sound different from a voice of the participant, and wherein data of the background sound obtained by the sound image localization process together with sound data of the utterer is transmitted to a terminal used by the listener.

5. The information processing device according to claim 4, further comprising:

circuitry configured to:

select the background sound according to setting by the participant.

6. The information processing device according to claim 5, wherein data of the background sound is transmitted to a terminal used by the listener who has selected the background sound.

7. The information processing device according to claim 5, wherein data of the background sound is transmitted to a plurality of client terminals used by all the participants including the participant who has selected the background sound.

8. The information processing device according to claim 1, wherein a position of each of the participants in a virtual space is managed based on a position of visual information visually representing each of the participants on a screen displayed on a terminal used by each of the participants.

9. The information processing device according to claim 8, wherein a group of the participants is formed according to setting by the participants, and wherein the sound image localization process is performed using the same HRTF data on sound data of the participants belonging to the same group.

10. The information processing device according to claim 1, further comprising:

managing a position of each of the participants in a virtual space as a position commonly used among all the participants.

11. The information processing device according to claim 1, wherein the location information is shared with each of the plurality of users.

12. An information processing method comprising:

by an information processing device, acquiring position information corresponding to each user of a plurality of users in a virtual space set up by each user and sound data from each of a plurality of uttering users participating in a conversation via a network;

storing head-related transfer function (HRTF) data corresponding to a plurality of positions of each of the plurality of uttering users based on a position of a listening user performing a sound image localization process for the plurality of users based on a relative positional relationship between the position of the listening user of the plurality of users and the position of each uttering user of the plurality of users in the virtual space;

generating audio data corresponding to each listening user of the plurality of users based on the sound image localization process;

acquiring group setting information which is information grouping the uttering users set by each of the users, wherein the group setting information is stored in association with information of each of the users who set up a group; and performing the sound localization process for the plurality of users using the same HRTF for sound data of the uttering users belonging to the same group in the group setting information corresponding to the each listening user of the plurality of users.

13. A non-transitory computer readable medium storing instructions that, when executed by a computer, cause the computer to execute the processes of:

acquiring position information corresponding to each user of a plurality of users in a virtual space set up by each user and sound data from each of a plurality of uttering users participating in a conversation via a network;

storing head-related transfer function (HRTF) data corresponding to a plurality of positions of each of the plurality of uttering users based on a position of a listening user;

performing a sound image localization process for the plurality of users based on a relative positional relationship between the position of the listening user of the plurality of users and the position of each uttering user of the plurality of users in the virtual space;

generating audio data corresponding to each listening user of the plurality of users based on the sound image localization process;

acquiring group setting information which is information grouping the uttering users set by each of the users, wherein the group setting information is stored in association with information of each of the users who set up a group; and performing the sound localization process for the plurality of users using the same HRTF for sound data of the uttering users belonging to the same group in the group setting information corresponding to the each listening user of the plurality of users.

* * * * *